United States Patent
Maskell et al.

(10) Patent No.: US 11,627,833 B2
(45) Date of Patent: Apr. 18, 2023

(54) ACTUATOR FOR SELF-HEATING CONTAINER

(71) Applicant: Tempra Technology, Inc., Bradenton, FL (US)

(72) Inventors: Alan James Maskell, Grittleton (GB); Corey R. Blanchette, Sarasota, FL (US); Cullen M. Sabin, Bradenton, FL (US)

(73) Assignee: Tempra Technology, Inc., Bradenton, FL (US)

( * ) Notice: Subject to any disclaimer, the term of this patent is extended or adjusted under 35 U.S.C. 154(b) by 231 days.

(21) Appl. No.: 17/198,977

(22) Filed: Mar. 11, 2021

(65) Prior Publication Data

US 2021/0282587 A1 Sep. 16, 2021

Related U.S. Application Data

(60) Provisional application No. 62/988,647, filed on Mar. 12, 2020.

(51) Int. Cl.
*A47J 36/24* (2006.01)
*A47G 19/22* (2006.01)

(52) U.S. Cl.
CPC ...... *A47J 36/2472* (2013.01); *A47G 19/2288* (2013.01)

(58) Field of Classification Search
CPC .. A47J 36/2472; A47J 36/245; A47G 19/2288
USPC .......................................................... 219/432
See application file for complete search history.

(56) References Cited

U.S. PATENT DOCUMENTS

| 5,035,230 | A | * | 7/1991 | Steidl | F24V 30/00 126/263.08 |
| 5,984,953 | A | * | 11/1999 | Sabin | A61F 7/03 607/108 |
| 6,267,110 | B1 | * | 7/2001 | Tenenboum | B65D 81/3484 126/262 |
| 9,108,789 | B2 | * | 8/2015 | Paul | B65D 81/3484 |
| 11,072,481 | B2 | * | 7/2021 | Paul | B29C 39/10 |

(Continued)

FOREIGN PATENT DOCUMENTS

WO    WO 2005/108878    11/2005

OTHER PUBLICATIONS

International Search Report and Written Opinion for PCT/US21/21944, dated May 27, 2021.

*Primary Examiner* — Eric S Stapleton
(74) *Attorney, Agent, or Firm* — Sheehan Phinney Bass & Green PA

(57) ABSTRACT

A self-heating container assembly has a housing with a first portion and a second portion, each having a cylindrical cross-section. The first portion and the second portion are mated together in a manner that permits the first portion to rotate about a common axis relative to the second portion. A ring gear (or partial ring gear) is on or attached to the first portion and rotates with the first portion of the housing relative to the second portion. A rotatable cutting element is supported by a support connected to the second portion of the housing. There is a pinion gear on the rotatable cutting element. The pinion gear is coupled to the ring gear. A reactant container containing a reactant is adjacent to the rotatable cutting element, such that rotation thereof cuts into the reactant container.

14 Claims, 18 Drawing Sheets

(56) References Cited

U.S. PATENT DOCUMENTS

| | | | | |
|---|---|---|---|---|
| 2001/0037872 A1* | 11/2001 | Sabin | ................ | B65D 81/3484 |
| | | | | 165/10 |
| 2007/0204851 A1* | 9/2007 | Justo | ...................... | F24V 30/00 |
| | | | | 126/262 |
| 2008/0139865 A1* | 6/2008 | Galliher | ................ | C12M 41/14 |
| | | | | 588/249 |
| 2008/0271729 A1* | 11/2008 | Kolb | ....................... | F24V 30/00 |
| | | | | 126/263.08 |
| 2010/0239877 A1* | 9/2010 | Paul | ....................... | H05B 6/06 |
| | | | | 427/591 |
| 2011/0180055 A1* | 7/2011 | Jo | ...................... | B65D 81/3484 |
| | | | | 126/263.09 |
| 2015/0314943 A1* | 11/2015 | Paul | ................. | B65D 81/3484 |
| | | | | 219/617 |
| 2017/0267437 A1* | 9/2017 | Sabin | ................... | B65D 77/048 |
| 2021/0131705 A1* | 5/2021 | Blanchette | .............. | F24V 30/00 |
| 2021/0289987 A1* | 9/2021 | Maskell | ............ | B65D 81/3484 |

* cited by examiner

SECTION A-A

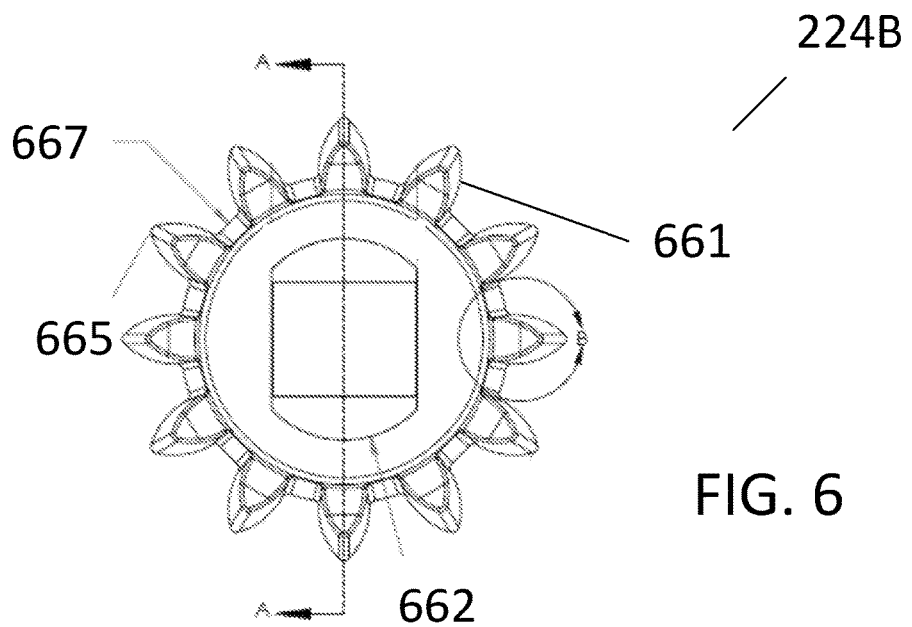
FIG. 6
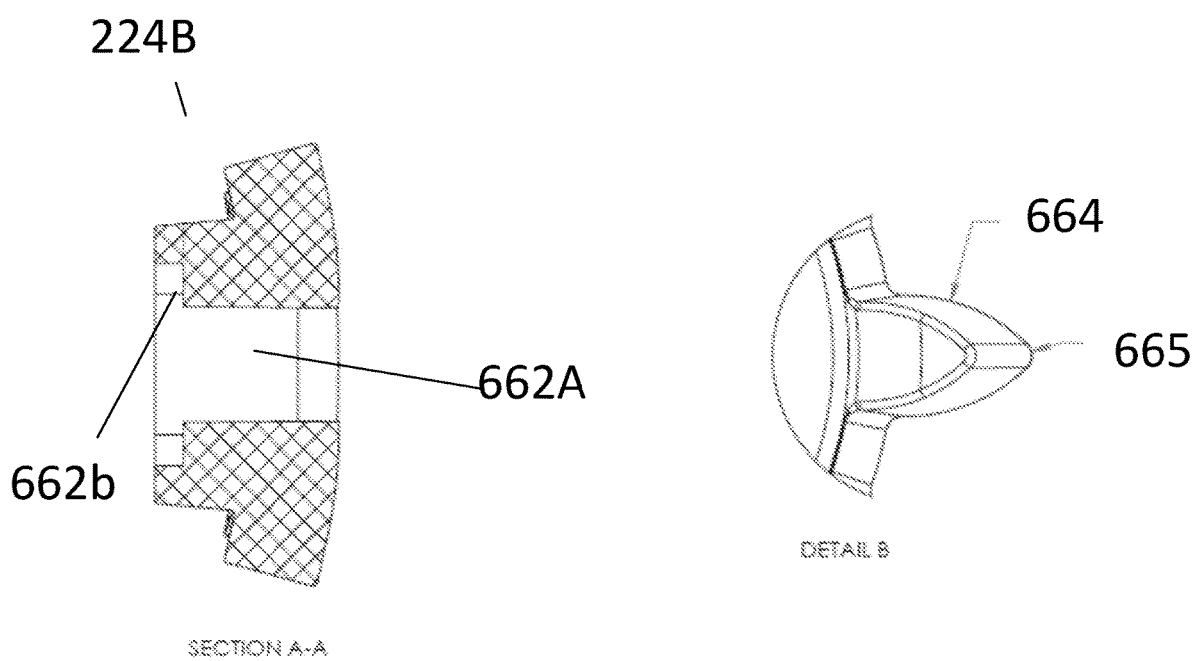
FIG. 6A
FIG. 6B

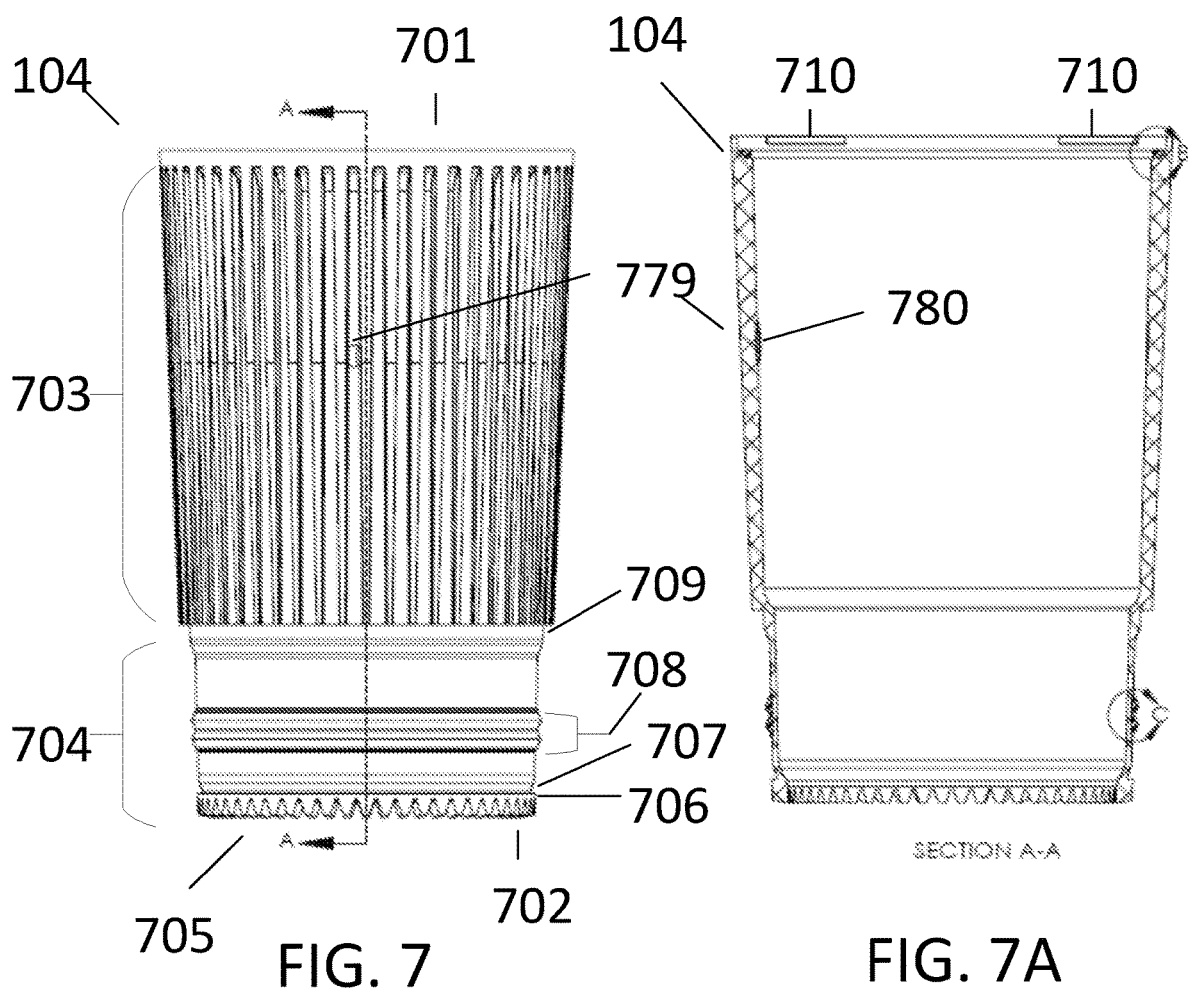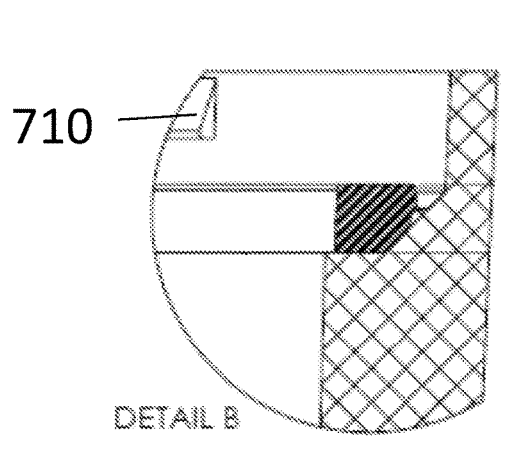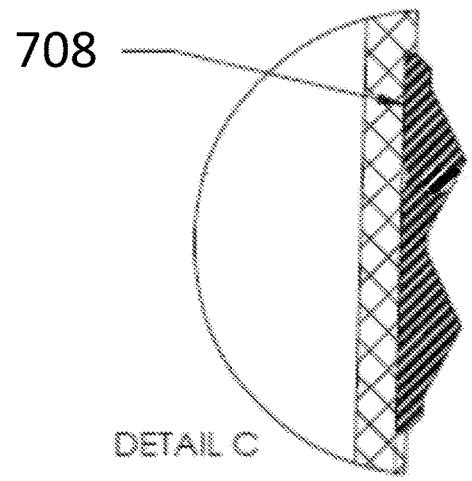
FIG. 7        FIG. 7A
FIG. 7B       FIG. 7C

ACTUATOR FOR SELF-HEATING CONTAINER

CROSS-REFERENCE TO RELATED APPLICATION(S)

This application claims the benefit of priority to U.S. Provisional Patent Application No. 62/988,647 entitled Gear Drive Actuator for Self-Heating Beverage Container, which was filed on Mar. 12, 2020. The disclosure of the prior application is incorporated by reference herein in its entirety.

BACKGROUND

This disclosure relates to self-heating beverage container assemblies and, more specifically, relates to systems and methods for actuating self-heating beverage container assemblies.

SUMMARY OF THE INVENTION

In one aspect, a self-heating container assembly has a housing with a first portion and a second portion, each having a cylindrical cross-section. The first portion and the second portion are mated together in a manner that permits the first portion to rotate about a common axis relative to the second portion. A ring gear (or partial ring gear) is on or attached to the first portion and rotates with the first portion of the housing relative to the second portion. A rotatable cutting element is supported by a support connected to the second portion of the housing. There is a pinion gear on the rotatable cutting element. The pinion gear is coupled to the ring gear. A reactant container containing a reactant is adjacent to the rotatable cutting element, such that rotation thereof cuts into the reactant container.

In some implementations, one or more of the following advantages are present.

For example, systems and methods are presented herein to activate (or initiate heating in) a self-heating beverage container assembly. In a typical implementation, the assembly includes a relatively simple configuration, in which the manufacturing and assembling of components in the assembly is relatively easy and very cost efficient.

In a typical implementation, the self-heating beverage container assembly is portable, self-contained, quick-to-heat, with a controlled temperature profile, and is easy to activate. The container assembly includes a basic, sleekly-designed and insulated housing that is substantially cylindrical or frustoconical in shape.

It is also easy to activate the self-heating by simply twisting the upper portion of the housing relative to the base portion of the housing. More specifically, in typical implementations, the activation system disclosed herein enables a human user to activate (or initiate heating in) the self-heating beverage container assembly by a simple twisting action. This functionality (i.e., being able to activate or initiate heating by a simple twisting action, without any axial motion) eliminates the need for any unsightly, cumbersome, or inconvenient external trigger mechanisms (e.g., knobs, buttons, or the like) that might otherwise be needed on the outer surface of the self-heating beverage container assembly. Instead, as is apparent from several of the figures and the description contained herein, the outer surface of the self-heating beverage container assembly 100 presents a sleek, sophisticated, and distinctive in appearance, without interruptions from any protruding trigger mechanisms.

Moreover, the lack of any externally protruding trigger mechanisms eliminates any concerns that a potential purchaser might have about the container being able to fit into standard drink holder. For example, if the self-heating container had an external knob protruding from a side surface thereof, the container may not fit well into a car's drink holder, which may present an inconvenience to any purchasers and may even dissuade potential purchasers from making a purchase. With the twist-to-activate functionality, it is apparent that the container, with its self-heating functionalities, would fit perfectly well in a standard car's drink holder.

In some implementations, the twisting motion of the upper portion of the housing relative to the base portion of the housing is translated into a rotational motion that causes a cutting assembly to cut into and rupture one or more containers inside the assembly that contain the heating reactants. In some implementations, the systems and techniques disclosed herein utilize a 90-degree gear drive arrangement, in which there are teeth molded onto the end of one of the vertical rotating parts (e.g., the upper portion), which drives a gear mounted on a horizontal shaft that supports the cutting assembly. In general, a small amount of rotation to the upper portion of the housing relative to the lower portion of the housing can provide a substantial amount of rotation to the horizontal shaft, since dimensional restraints indicate that any such mechanism will rotate the horizontal shaft many times for only single rotation of the vertical part. For example, in one exemplary implementation, the large gear is 2.38 inches in diameter, and the smaller, driven gear is 1 inch, giving a rotation of the driven shaft 2.38 turns for a full turn of the upper section with regard to the lower.

There are several advantages to such an arrangement. First, if the two meshing gears are continuous, each forming a complete circle, orientation of the upper portion relative to the lower portion during assembly is immaterial. Moreover, beyond about the first quarter-turn, the extent of the rotation of the upper portion relative to the lower portion is irrelevant and may be continued without harm.

Other features and advantages will be apparent from the description and drawings, and from the claims.

BRIEF DESCRIPTION OF THE DRAWINGS

FIG. 6-6B are views of the pinion gear of the self-heating beverage container assembly of FIG. 1.

FIG. 7-7C are views of the upper portion of the self-heating beverage container assembly of FIG. 1.

Like reference numerals refer to like elements.

DETAILED DESCRIPTION

Figure 1:
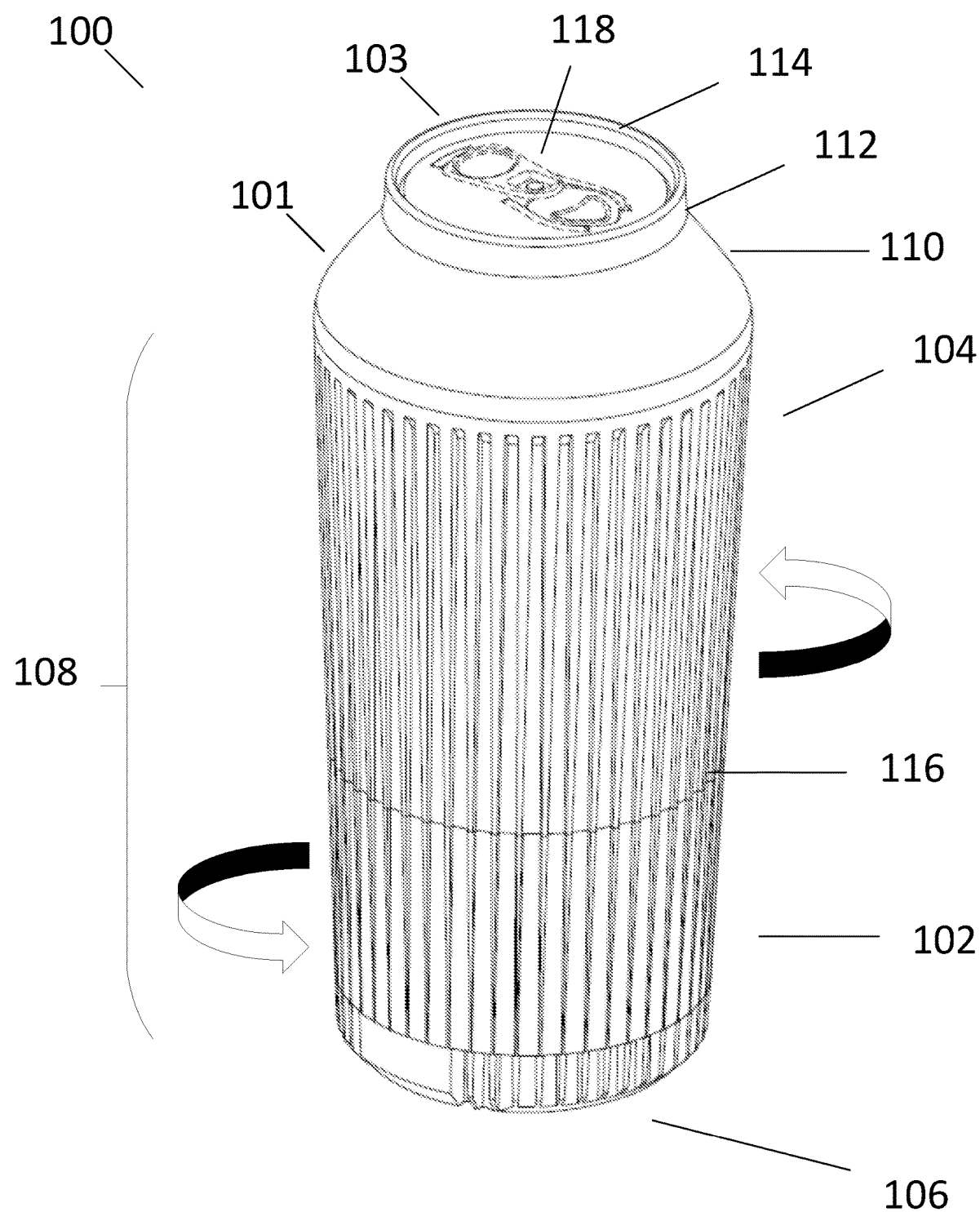
FIG. 1 is a perspective view showing an implementation of a self-heating beverage container assembly.

FIG. 1 is a top, perspective view of one example of a self-heating beverage container assembly 100 whose heating functionality can be activated or initiated by twisting a base portion 102 of the container 100 relative to an upper portion 104 of the container 100, as represented in the arrows shown in the figure. To impart this twisting motion upon the container 100 and thereby initiate heating of the typically consumable contents in the container 100, a person can simply grip the base portion 102 of the container 100 with one hand, grip the upper portion 104 of the container 100 with his or her other hand, and twist. This twisting motion is represented by curved arrows in the figure. In some implementations, the container 100 may be configured such that the twisting must be done in a particular direction to initiate heating. However, in other implementations, the container 100 may be configured to initiate heating regardless of the direction of twisting.

This functionality (i.e., being able to activate or initiate heating by a simple twisting action) eliminates the need for any unsightly, cumbersome, or inconvenient external trigger mechanisms (e.g., knobs, buttons, or the like) on the outer surface of the self-heating beverage container assembly 100. Instead, as is apparent from the image in the figure, the outer surface of the self-heating beverage container assembly 100 presents a sleek, sophisticated, and distinctive in appearance, without interruptions from a protruding trigger mechanism. Moreover, the lack of any externally protruding trigger mechanisms eliminates any concerns about the container being able to fit into standard drink holder configurations. For example, if the self-heating container 100 had an external knob protruding from a side surface thereof, the container may not fit well into a car's drink holder. With the twist-to-activate functionality, it is apparent that the container 100, as long as its outer diameter is not too large, would fit perfectly well in a standard car's drink holder.

The base portion 102 of the container 100 is mated to the upper portion 104 of the container 100. This mating, between the base portion 102 and the upper portion 104, is done in a manner that permits the base portion 102 to rotate relative to the upper 104, which is required for the aforementioned twist-to-activate functionality to occur. This mating (between the base portion 102 and the upper portion 104) is further done in a manner that seals (e.g., with an O-ring or the like) the interior compartment of the container (where the heating reaction occurs) from the container's external environment. In the illustrated implementation, a seam 116 extends around a periphery of the container 100 denoting the physical separation between the base portion 102 of the container 100 and the top portion 104 of the container 100.

The self-heating container 100 has an external housing 101 and a beverage can 103 contained almost entirely inside the external housing 101. Only a very small portion 114 of the top of the beverage can 103 is shown peeking out through a circular opening at the top of the housing 101. The beverage can 103 in the illustrated implementation is a standard type of beverage can with an opening mechanism 118 exposed at the top end of the can. The opening mechanism in the illustrated example is a stay-on-tab style opening mechanism. However, the opening mechanism can, of course, be any kind of opening mechanism. The beverage can 103 holds the beverage to be heated.

The housing 101 is formed from a base portion 102, an upper portion 104 and a shoulder 110. The base portion 102 has a bottom surface 106 that extends across an entirety of the bottom of the self-heating container 100. The base portion 102 and the upper portion 104 have ribbed side surface 108 (that provide some degree of thermal protection for a person gripping the container when heated). The shoulder portion 110 is secured to the upper portion and defines the opening through which the top of the beverage container 103 extends, when assembled. When the container assembly is assembled, the ribbed side surfaces of the base portion 102 and the upper portion 104 extend virtually uninterrupted (except for the seam where the two meet) from the bottom surface of the container assembly to the shoulder portion. In some instances, the bottom (outwardly-facing) surface of the container assembly may include ribs as well.

Each ribbed side surface (of the base has a plurality of equally-spaced vertical ribs, each of which extends from the bottom 106 (or close to the bottom) of the container 100 to the shoulder portion 110 (or close to the shoulder portion 110) of the container 100. The ribs are parallel to one another and also relatively close to one another. In a typical implementation, this ribbed pattern extends, with substantial uniformity, around the entire periphery of the side surface 108. In a typical implementation, the ribbed pattern provides a degree of thermal insulation so as to make the container 100 more comfortable to touch or hold when the heating reaction is occurring inside the container 100 or when the container 100 has a heated beverage inside of it that the person is either consuming or preparing to consume.

In a typical implementation, rotating the base portion 102 of the container 100 relative to the upper portion 104 of the container 100 causes two reactants that are otherwise kept physically separated from one another inside the self-heating container 100 to come into contact, thereby initiating an exothermic reaction within the self-heating container 100. Heat from the exothermic reaction is transferred through the beverage can 103 and into the beverage contained therein to heat that beverage. There are a variety of different types of reactants that can be used to produce the exothermic reaction. In one preferable embodiment, the reaction involves a fuel (e.g., an aqueous ethylene glycol) and an oxidizing agent for the fuel (e.g., a granular potassium permanganate). In some implementations, the oxidizing agent may be coated with a coating (e.g., sodium silicate) that dissolves as the reaction progresses to help control the reaction's intensity and prolong its duration.

Figure 2:
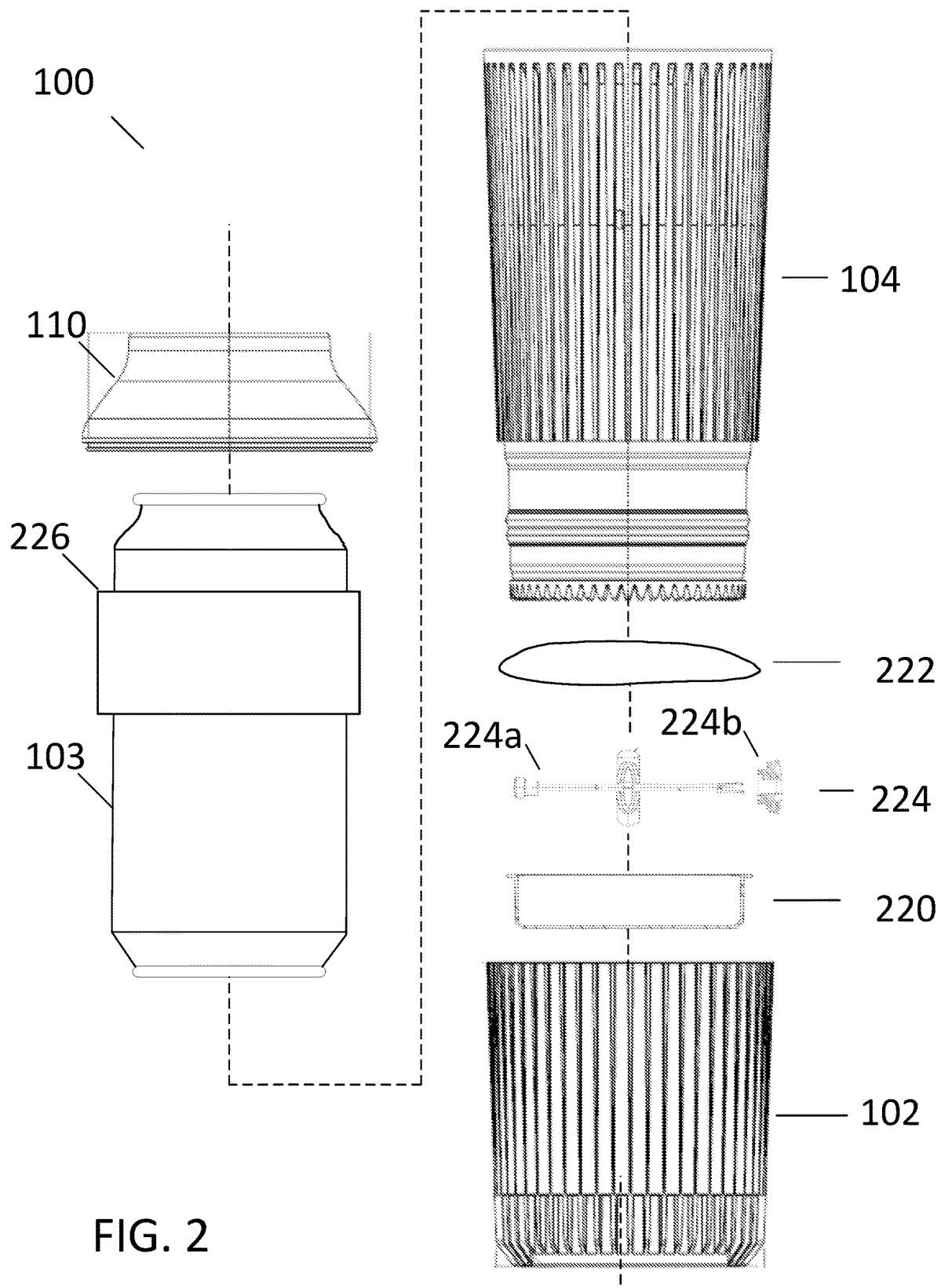
FIG. 2 is a side, exploded view of the self-heating beverage container assembly of FIG. 1.
Figure 3:
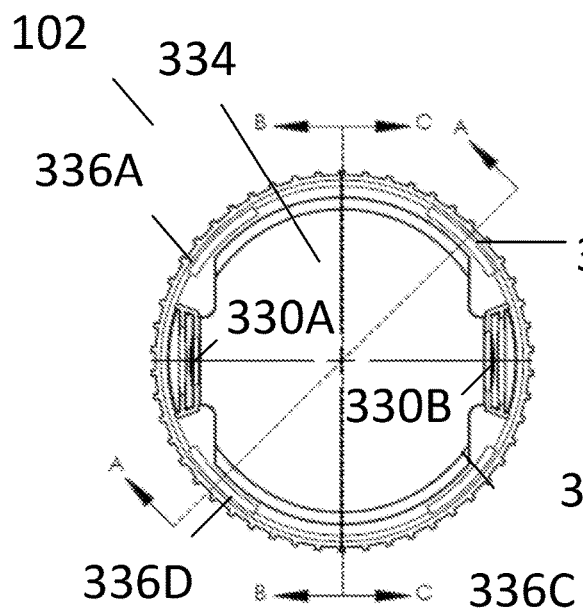
FIGS. 3-3C are views of a lower portion of the self-heating beverage container assembly of FIG. 1.
Figure 3A:
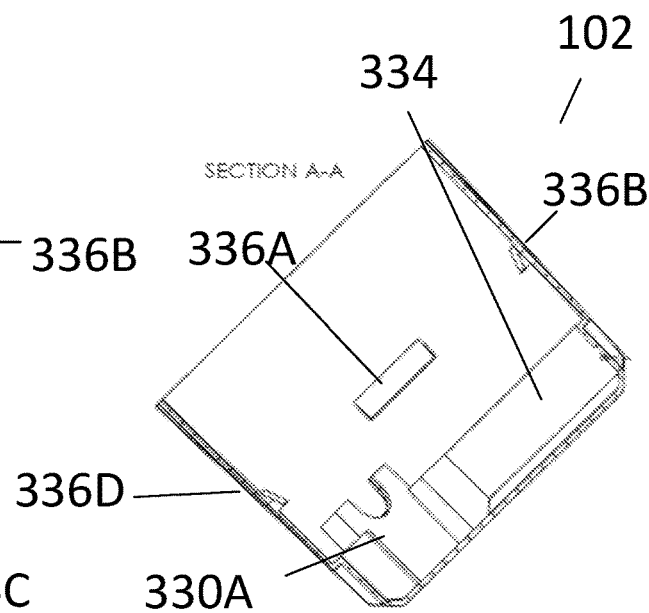
Figure 3B:
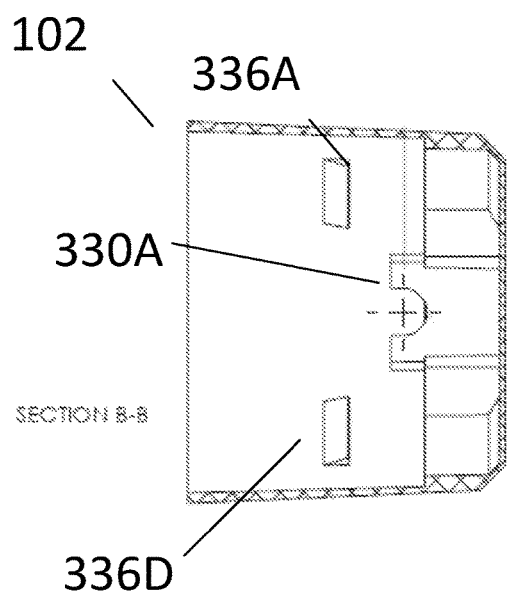
Figure 3C:
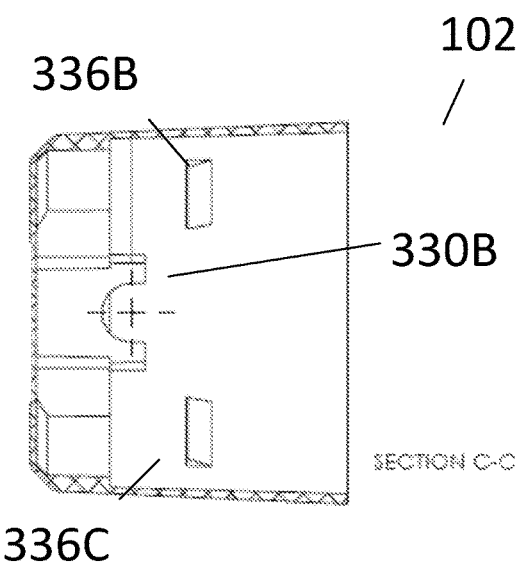
Figure 4:
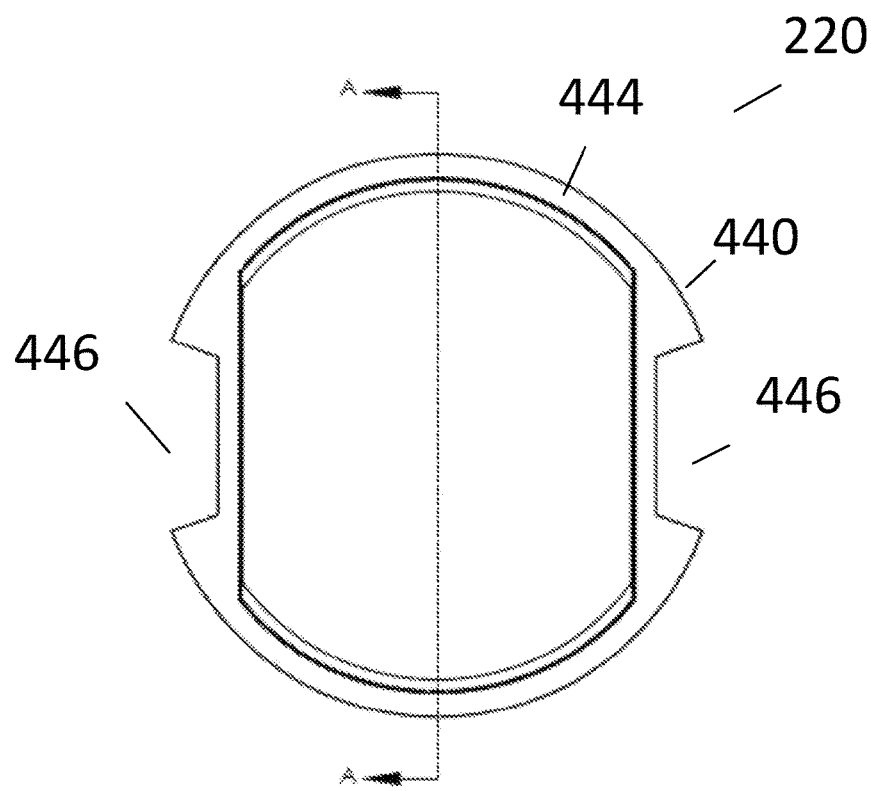
FIGS. 4 and 4A are views of the reactant container in the self-heating beverage container assembly of FIG. 1.
Figure 4A:
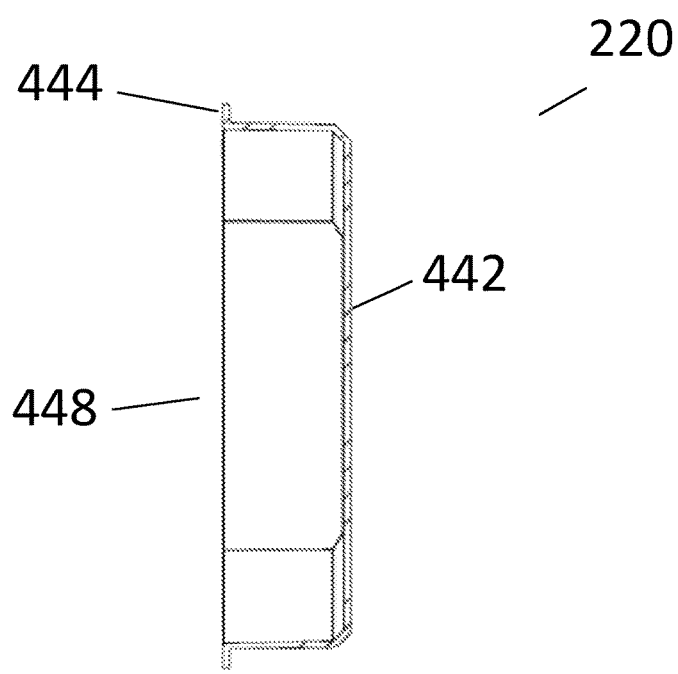

FIG. 2 is an exploded side view of the self-heating container 100 from FIG. 1 showing the base portion 102, upper portion 104, the shoulder 110, the beverage can 103, and several internal components of the self-heating container 100. The internal components shown in the drawing include a first reactant container 220 that contains a first one of the reactants that participates in the exothermic reaction, a second reactant container 222 that contains a second one of the reactants that participates in the exothermic reaction, a cutting assembly 224 that is configured to cut or rupture one or both containers 220, 222 when the base portion 102 of the container 100 is rotated relative to the upper portion 104 of the container 100. Each component of the illustrated self-heating container 100 is described in further detail below and with further reference to FIGS. 3-9, as appropriate.

When assembled, various components shown in FIG. 2 are configured as follows. The first reactant container 220 sits inside and at the bottom of the base portion 102. The cutting assembly 224 also sits inside the base portion 102, supported on bearing surfaces, just above the first reactant chamber 220. The second reactant container 222 is just above the cutting assembly 224 also inside the base portion 102. The bottom (non-ribbed) section of the upper portion 104 extends into the base portion 102. The shoulder portion 110 snaps onto the open top of the upper portion 104. The beverage container 103 sits inside the shoulder portion 110 and the upper portion 104 with its top extending up through the opening at the top of the shoulder portion.

The base portion 102 of the container assembly is hollow, cup-shaped, and generally frustoconical that defines an internal space that is closed on the bottom 106 (i.e., smaller diameter end), but open at the top (i.e., the larger diameter end). Two shaft support members 330a, 330b extend up from the bottom 106 of the base portion 102 inside the space at diametrically opposite sides of the space. Each shaft support member presents an upwardly-facing, u-shaped bearing surface 332 for supporting one end of the cutting assembly's shaft. More specifically, the shaft support members 330a, 330b are configured relative to one another such that, with the cutting assembly shaft supported on opposite ends by the shaft support members 330a, 330b, the cutting assembly shaft extends roughly diametrically across the middle of the space inside the base portion 102.

The base portion 102 defines a pocket 334 inside the space for receiving and holding, typically somewhat snugly, the first reactant container 220.

The base portion 102 has four tabs 336a, 336b, 336c, 336d that extend inwardly a small distance from an inner side surface of the base portion 102. Each tab 336a, 336b, 336c, 336d defines a sloped surface that extends from the inner side surface of the base portion 102 (or near the inner side surface) in a downward and inward direction. Each tab 336a, 336b, 336c, 336d further defines a flat bottom surface that faces the bottom 106 of the base portion 102 and that extends from the inner side surface to the bottom of the sloped surface. Collectively, the tabs 336a, 336b, 336c, 336d are configured to engage an annular groove on the upper portion 104 of the container assembly when the upper portion 104 of the container assembly is pressed into the base portion 102 of the container assembly.

The first reactant container 220 is a sealed container that contains a first one of the reactants that participate in the exothermic reaction. In a typical implementation, that first reactant is a solid, granular or powdered oxidizing agent (e.g., granular or powdered potassium permanganate) used in the exothermic reaction. The first reactant container 220 can be configured in any number of potential ways. In the illustrated implementation, the first reactant container 220 has a rigid, cup-shaped body 440 with an open top and a closed bottom 442. The body 440 defines a lip 444 that extends around a perimeter of the open top of the cup-shaped body 440. A seal 448 extends across the open top of the body 440 and is adhered to the upper surface of the lip 444. In some implementations, the seal is permeable to liquid (e.g., the liquid second reactant in the second reactant container 222). Moreover, in some implementations, the seal is frangible or susceptible to rupturing or being cut open by the cutting assembly 224. The outer perimeter of the lip 444 defines a pair of notches 446 at opposite sides of the first reactant container 220. Each notch 446 is sized and shaped to allow a corresponding one of the shaft support members 330a, 330b to extend upward from the bottom surface of the base portion 102 so that the cutting assembly 224 can be supported above the first reactant container 220. In some implementations, the first reactant container 220 may be of a style disclosed in the current applicant's co-pending U.S. patent application Ser. No. 17/082,710, entitled SEALED PACKAGE FOR SOLID REACTANT IN SELF-HEATING ASSEMBLY, which is incorporated by reference herein in its entirety. When the self-heating container assembly 100 is assembled, the first reactant container 220 is placed into the bottom of the base portion 102 of the container assembly. More specifically, the first reactant container 220 is placed into the pocket 334 for receiving and holding, typically somewhat snugly, the first reactant container 220.

The cutting assembly 224 has a cutting element 224a and a pinion gear 224b. Although shown as two pieces, during assembly, the pinion gear 224b is pressed onto the end of the cutting element's shaft to form essentially one a single component. When so assembled, the pinion gear 224b and the cutting element 224a are securely connected to one another so that they rotate (e.g., about an axis "A" defined by the cutting element's shaft) and otherwise move, together, as one single piece and so that they do not generally move relative to one another at all.

The cutting element 224a has a shaft 550, an end cap 551 on one end of the shaft, a gear-mating element 552 at an opposite end of the shaft, and a pair of cutting blades assemblies 553a, 553b that extend in a radially outward from the cylindrical shaft about midway between the end cap 551 and the gear-mating element 552. In the illustrated example, the pinion gear, with a square center hole, slips onto a mating shape on the shaft, and clips in place. The joint need not be square. It might be splined, or smooth round with a key, or many other shapes, the only two requirements typically being that the gear not turn without forcing the shaft to turn, and that it not fall off during handling and assembly processes.

Each cutting blade assembly 553a, 553b has a cutting blade 554a, 554b that extends in a radially outward direction from the cylindrical shaft. The first cutting blade 554a points in an opposite direction from the second cutting blade 554b. The specific configuration of the cutting blades 554a, 554b can vary. In the illustrated implementation, however, the cutting blades 554a, 554b are sturdy, rigid spikes with pointed tips at distal ends thereof. These cutting blades 554a, 554b are able to push through and/or tear into/rupture the seal 448 of the first reactant container 220 and/or the second reactant container 222 (which may be a plastic bag, for example) when the cutting blade assembly 553a, 553b is rotated from a neutral position. In some implementations, the cutting blades may have other sharp, cutting surfaces, that can help cut into either the first reactant container 220 or the second reactant container 222.

Figure 5:
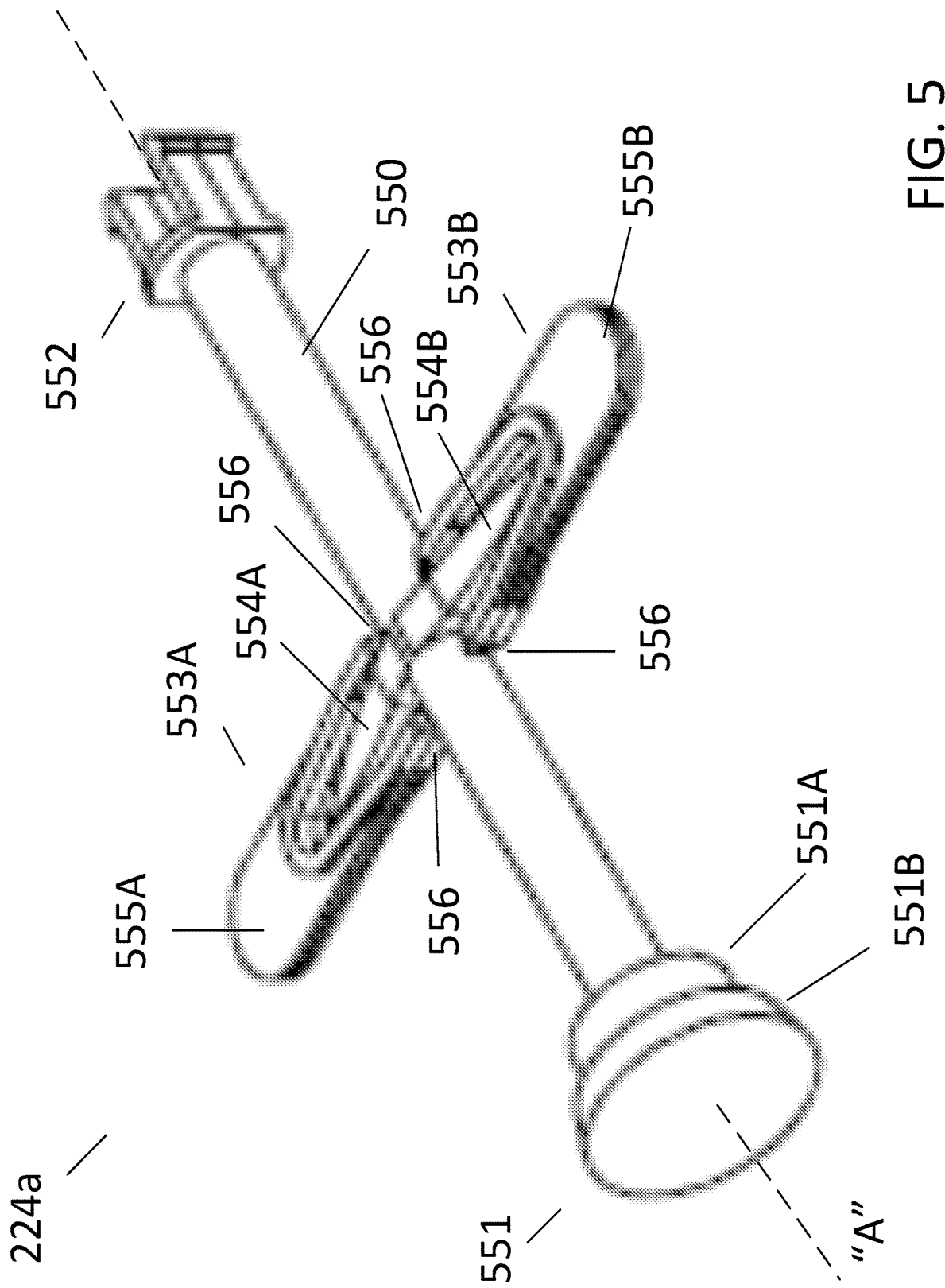
FIGS. 5-5B are views of the cutting assembly of the self-heating beverage container assembly of FIG. 1.
Figure 5A:
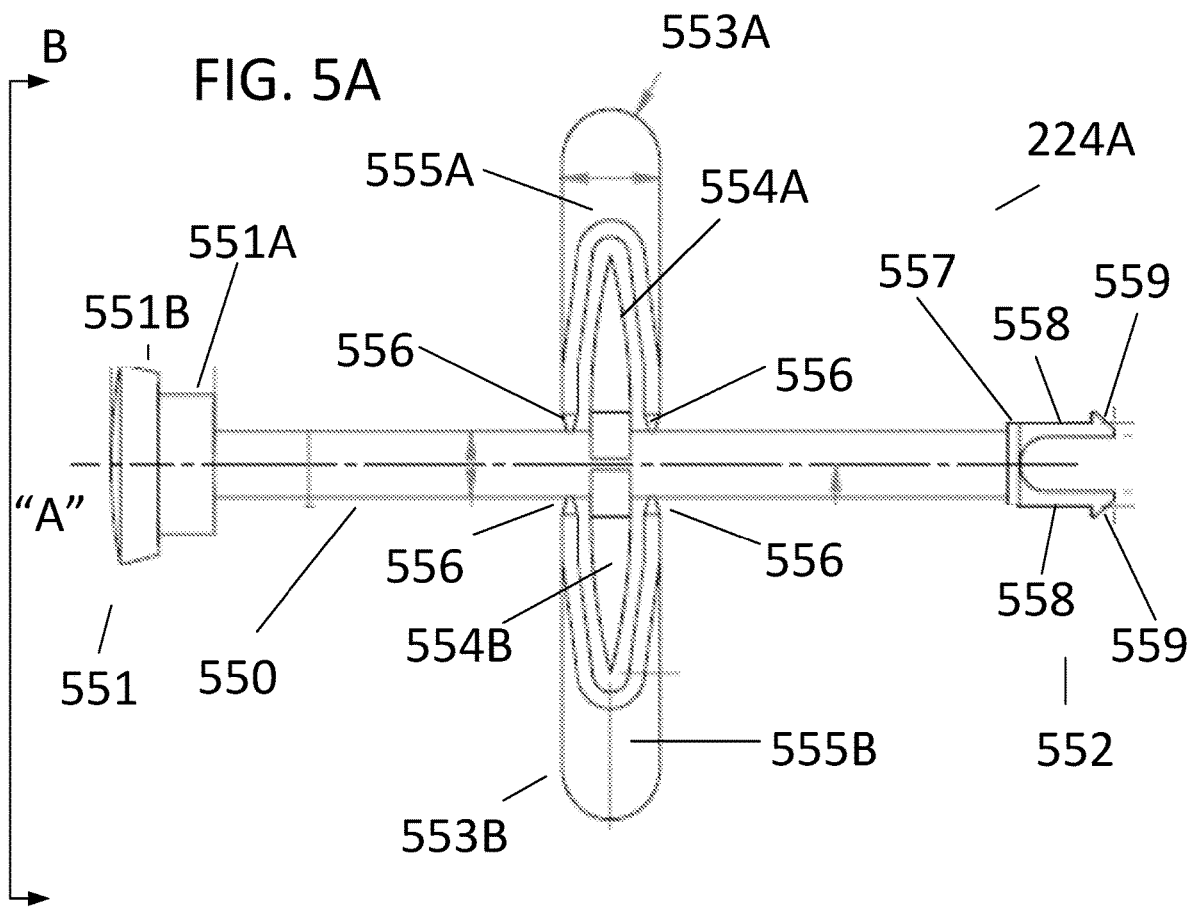
Figure 5B:
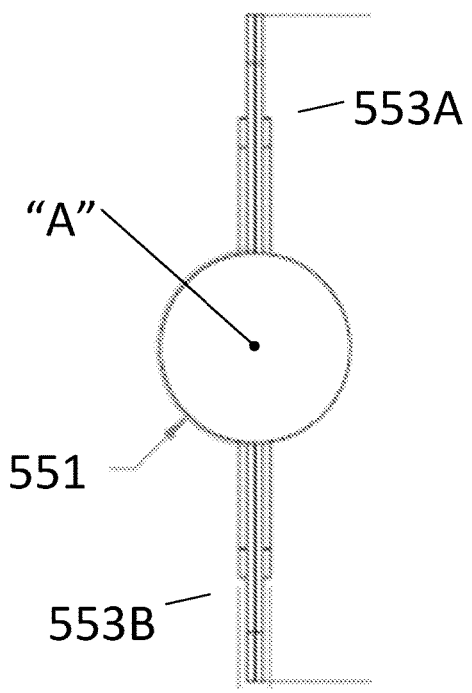
Figure 8:
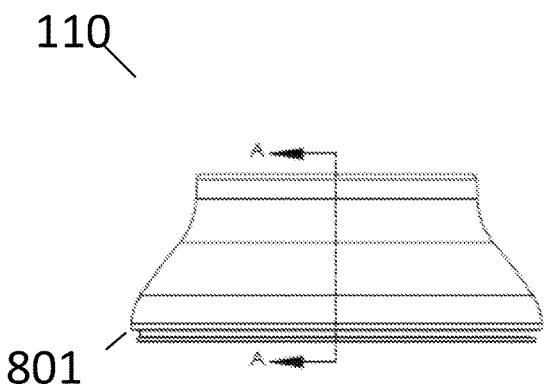
FIG. 8-8D are views of the shoulder portion of the self-heating beverage container assembly of FIG. 1.
Figure 8A:
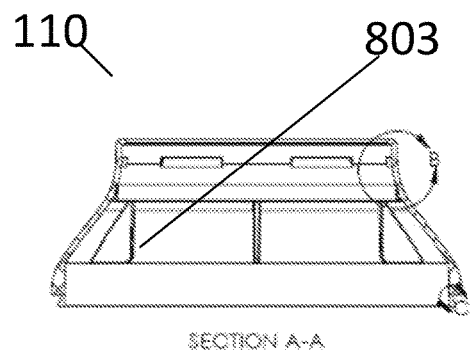
Figure 8B:
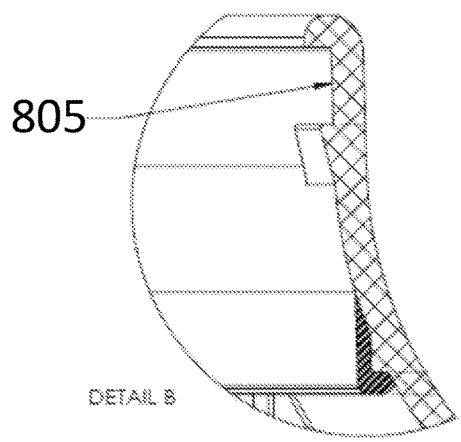
Figure 8C:
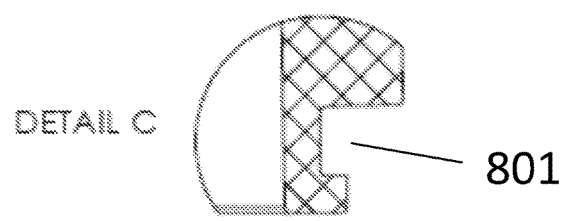
Figure 8D:
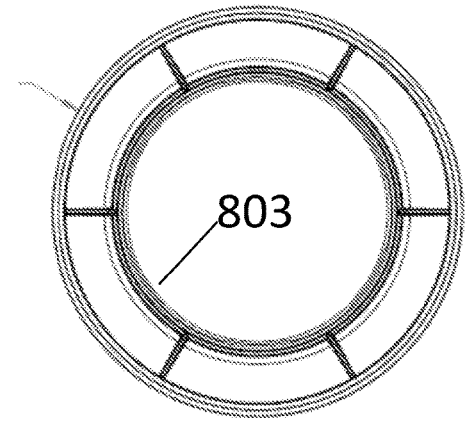

Each cutting blade assembly 553a, 553b in the illustrated implementation has a blade guard 555a, 555b that extends in a radially outward direction from the cylindrical shaft. The first blade guard 555a extends around the distal tip of the first cutting blade 554a. The second blade guard 555b extends around the distal tip of the second cutting blade 554b. More specifically, in the illustrated implementation, each blade guard defines, in cooperation with the shaft 550 from which it extends, a frame, within which the corresponding cutting blade 554a, 554b sits. As shown in FIG. 5B, in the illustrated implementation, no portion of the cutting blades 554a, 554b extends out from the space within the frame. Unlike the pointed distal tips of the cutting blades 554a, 554b, the distal ends of the blade guards 555a, 555b are rounded and broad. Neither the distal tips of the blade guards, nor any other portion of the blade guards is particularly well suited to cut or push through or tear into or rupture either the seal 448 on the first reactant container 220 or the second reactant container 222. Therefore, with the blade guards 555a, 555b configured as shown in FIGS. 5, 5A, and 5B (extending around the distal tips of the cutting blades 554a, 554b), the blade guards prevent the distal tips (or any portion) of the cutting blades 554a, 554b from coming into contact with the seal 448 on the first reactant container 220 or the second reactant container 222 in a manner that might risk inadvertently rupturing or tearing or otherwise comprising the seal 448 or the second reactant container 222.

That said, however, each blade guard 555a, 555b in the illustrated implementation is connected to the shaft 550 in a manner that makes it very easy for the blade guards to snap off from the shaft if/when a relatively small amount of torque is applied to the blade guards. More specifically in this regard, each blade guard 555a, 555b in the illustrated implementation is connected to the shaft via a very thin bridge 556 (or segment of material) that is significantly more likely to snap under the application of torque on the blade guard than any other portion of blade guard 555a, 555b. Thus, in a typical implementation, when the cutting element 224a begins to rotate about its axis, one of the blade guards begins to press against the seal 448 on the first reactant chamber 220 below the cutting assembly 224a, while the other of the blade guards begins to press against the second reactant chamber 222 above the cutting element 224a. Since the distal ends of the blade guards 555a, 555b are rounded and broad, the pressing does not structurally compromise the seal 448 on the first reactant container 220 or the second reactant container 222. The pressing does, however, apply a torque to the blade guards 555a, 555b that, eventually, causes one or both of the blade guards 555a, 555b to snap or break away from the shaft of the cutting element 224a (at the weak point/bridge 556).

When one (or both) of the blade guards snaps off or breaks away from the shaft 550 of the cutting element 224a, the associated cutting blade remains in place attached to the shaft and is thereby revealed or uncovered. Once uncovered, the cutting blade is free to contact and tear through either the seal 448 on the first reactant container 220 or the second reactant container 222 depending on which direction the cutting element is being rotated. Since the illustrated implementation has two cutting blades 554a, 554b extending from the shaft 550 in opposite directions, when one of the cutting blades is cutting into the seal 448 on the first reactant container 220, the other would be cutting into the second reactant container 222. Once the second reactant container 222 has been ruptured, the liquid reactant begins flowing out of the second reactant container 222 and down to the first reactant container 220. If, at that point, the seal 448 on the first reactant container 220 has been cut into (and/or if the seal is permeable to the liquid second reactant), the liquid second reactant flows into the solid, granular or powdered, first reactant and begins to produce heat. In the illustrated implementation, since there are two cutting blades 554a, 554b that extend from the shaft in opposite directions, depending on which way the cutting element 224a rotates, one of the cutting blades would cut through the seal 448 on the first reactant container 220 and the other one of the cutting blades would cut into the second reactant container 222.

The end cap 551, in various implementations, can take on any number of a variety of different configurations, and, in some implementations, the end cap 551 could be omitted entirely. In the illustrated implementation, however, the end cap 551 has two sections: a first section 551a with an outer diameter that is slightly larger than the diameter of the shaft 550, and a second section 551b with an outer diameter that is slightly larger than the outer diameter of the first section 551a. The second section 551b is at the very end of the cutting element 224a and the first section 551a is immediately adjacent to the second section 551b. The outer, cylindrical surface of the first section 551a of the end cap 551 is smooth and acts as a bearing contact surface that physically contacts the U-shaped bearing surface 332 on one of the support elements 334 in the base portion 102 of the self-heating beverage container. There are a variety of ways that the end cap 551 may be formed and/or attached to the shaft 550. In some instances, the end cap 551 may be integrally molded with the shaft (as well as with one or more, or all, of the other components shown in FIG. 5). In some instances, the end cap 551 may be formed separately from the shaft 550 and then pressed onto, and/or adhered to, the end of the shaft 550.

The gear-mating element 552 at the opposite end of the shaft 550 from the end cap 551 can be configured in any one of a variety of different ways. In general, it is configured to physically engage the pinion gear 224. In the illustrated implementation, the gear-mating element 552 has a base 557 and a pair of fingers 668 that extend, in an axial direction, from the base 557. The base 557 is physically attached to the end the shaft 550 and, in the illustrated implementation, is a flat, planar plate that lies in a plane perpendicular to a longitudinal axis of the shaft 550. Each finger 558 projects from a surface of the base 557 opposite the shaft 550. Each finger 558 has a flat, planar portion that extends from the surface of the base 557 in a direction that is parallel to the longitudinal axis of the shaft 500. The flat, planar portion of each finger 558 is substantially parallel to the flat, planar portion of the other finger 558. A small outwardly-extending projection 559 is formed at the distal end of each finger 558. That projection has an outer surface that is angled (and that slopes away from axis "A" moving away from the distal tip of the finger).

In a typical implementation, the fingers 558 are configured so that they can flex inwardly toward one another under the application of a relatively small force and then return to their configuration shown in FIG. 5A, for example, where they are substantially parallel to one another. The force that causes the fingers 558 to flex toward one another can come from trying to press the fingers through a centrally-disposed opening (aperture) in the pinion gear 224b. More specifically in this regard, the centrally-disposed opening in the pinion gear 224b is sized so that when the fingers 558 of the gear-mating element 552 are pressed into the centrally-disposed opening in the pinion gear 224b, the fingers 558 need to flex a bit in an inward direction towards one another in order for the projections 559 at the ends of the fingers to fit into (and through) the opening. Once the projections 559 pass completely through and clear the back end of the opening in the pinion gear 224b, the fingers snap back to their original configurations (e.g., as shown in FIG. 5A), where they are parallel to one another. At that point, the projections 559 at the ends of the fingers 558 reach outward to grip the opposite side of the pinion gear 224b through the opening. This securely couples the cutting element 224a to the pinion gear 224b.

The pinion gear 224b can have any one of a variety of different specific configurations. Generally, however, it is sized and configured to mate with the ring gear at the bottom annular surface of the upper portion 104 of the container assembly 100. In the illustrated implementation, the pinion gear 224b is a round gear with twelve external gear teeth 661. Each gear tooth 661 has curved side surfaces 664 that meet at a central point 665, and there is a circumferential space 667 between each set of adjacent teeth. The pinion gear 224b has a centrally-disposed opening 662 with a narrower portion 662a and a wider portion 662b. The narrower portion 662a is rectangular in cross-section (see, e.g., FIG. 6). The wider portion 662b is capsule-shaped (see, e.g., FIGS. 5 & 6). When the cutting element 224a is mated to the pinion gear 224b, the fingers 558 on the gear-mating element 552 of the cutting element 224a are inserted into the opening 662 at the wider portion 662b side of the pinion gear 224b. Once the fingers 558 extend all the way through the opening 662, the angled projections at the distal ends of the fingers snap into engagement with the pinion gear 224b at the end of the opening on the back side of the pinion gear 224b.

Once the self-heating container assembly 100 is assembled, the cutting assembly 224, which includes the cutting element 224a and the pinion gear 224b, sits inside the base portion 102, supported on the u-shaped bearing surfaces of the supporting elements 334, so that its shaft 550 sits slightly above, but very close to, the sealed top 448 of the first reactant container 220. When assembled, and prior to heater activation, the cutting assembly 224 is configured such that its blades assemblies 553a, 553b lie in a plane that is parallel to (or at least substantially parallel to) the sealed upper surface of the first reactant container 220. More specifically, in this configuration, the blade assemblies 553a, 553b sit above the sealed top of the first reactant container 220 and below the second reactant container 222, without pressing into either with enough force to cut into or rupture them. Moreover, when the self-heating container assembly 100 is assembled, the pinion gear 224b at the end of the cutting assembly's shaft engages with the ring gear at the bottom of the upper portion 104.

The second reactant container 222 in the illustrated implementation is a sealed, flexible, pliable container (e.g., a plastic bag or the like) that contains a second reactant that is able to react exothermically with the first reactant upon physical contact. The specific physical configuration of the second reactant container 222 can vary. However, in a typical implementation, the second reactant container 222 contains the second reactant, which may be a liquid oxidizing agent for example. Moreover, the second reactant container 222 typically is susceptible to rupturing or being cut open by the cutting assembly 224. In some implementations, the second reactant container 222 is a shrink film container, such as disclosed in the current applicant's co-pending U.S. patent application Ser. No. 17/186,409, entitled, SHRINK FILM CONTAINER FOR SELF-HEATING ASSEMBLY patent application, which is incorporated by reference herein in its entirety.

Once the self-heating beverage container assembly 100 is assembled, the second reactant container 222 sits inside the base portion 102, above the cutting assembly 224. In some implementations, the self-heating beverage container assembly 100 is configured so that the bottom, slightly-domed surface of the beverage container 103, presses down slightly on the second reactant container 222 to help hold the second reactant container 222 in place (e.g., during shipping, handling, storage, etc.) and while one of the cutting blades 554a, 554b is pressing against and cutting into the second reactant container 222.

The upper portion 104 of the self-heating container assembly is cup-shaped and generally frustoconical. The upper portion 104 has an open top 701 (at its larger diameter end) and an open bottom 702 (at its smaller diameter end). The upper portion 104 of the self-heating beverage container assembly 100 has a ribbed section 703 (with ribs on its outer surface, as shown) and a non-ribbed section 704 beneath the ribbed section. The non-ribbed section 704 of the upper portion 104 extends into the base portion 102 of the self-heating beverage container assembly 100 when the self-heating beverage container assembly 100 has been assembled.

The annular surface at the bottom of the non-ribbed section of the upper portion 104 is a ring gear 705. The ring gear 705 is configured to mate with the pinion gear 224b on the cutting assembly 224 when the self-heating beverage container assembly 100 has been assembled, so that when the self-heating beverage container has been assembled, and the upper portion 104 of the self-heating container 100 is rotated relative to the base portion 102 of the self-heating container 100, the ring gear 705 at the annular bottom surface of the upper portion 104 causes the pinion gear 224b (and, therefore, the entire cutting assembly 224) to rotate about its axis "A."

In a typical implementation, the upper portion 104 of the self-heating container assembly mates with the base portion 102 in a manner that permits the base portion 102 to be rotated about an axis of the self-heating beverage container assembly 100 relative to the upper portion 104 of the self-heating beverage container assembly 100, but that resists any axial motion therebetween that might tend to separate the base portion 102 and the upper portion 104. There are a variety of ways to achieve this kind of mating. This type of mating can be achieved in any number of a variety of possible ways. For example, in the illustrated implementation, an annular shoulder 706 is formed just above the ring gear at the bottom of the upper portion 104 with an annular groove 707 just above the shoulder. This annular groove 707 above the shoulder is configured to engage with a plurality of tabs 336a-336d that extend inwardly from the inner surface of the base portion 102 of the container assembly 100. The tabs 336a-336d may be configured so that they flex to allow the ring gear 705 to pass through them when the upper portion 102 is pressed into the lower portion 104 during assembly, and then to snap into engagement with the annular groove 707 just above the shoulder 706 This arrangement permits the base portion 102 to rotate relative to the upper portion 104 because the tabs 336a-336d simply slide, axially around, the annular groove 707 when any such relative rotation occurs. However, this arrangement also resists any axial motion that might tend to separate the base portion 102 from the upper portion 104. More specifically, the tabs 336a-336d press against the upper surface of the shoulder 706 to resist any such motion.

In a typical implementation, a seal is provided to prevent reactants from escaping the reaction chamber and to prevent environmental contaminants, including air, from entering the reaction chamber. There are a variety ways to implement this kind of seal. In the implementation represented in FIG. 2, for example, the seal can be provided by placing an O-ring (not shown) between outer surface of the section of the upper portion 104 that extends into the base portion 102, and the inner surface of the base portion 102. In this regard, there is an annular O-ring engagement feature 708 at the outer surface of the non-ribbed section of the upper portion 104. This O-ring engagement feature 708 is about midway up from the ring gear 705 to the bottom of the ribbed section 703 of the upper portion 104.

In the illustrated implementation, the O-ring engagement feature 708 is formed from two side-by-side annular projections that define a groove therebetween for receiving an O-ring. In a typical implementation, the O-ring is placed into the groove, and, when the upper portion 104 is pressed down into the base portion 102, the O-ring creates a seal between the upper portion 104 and the base portion 102.

The outer diameter of the non-ribbed section of the upper portion 104 flares outwardly to a larger diameter at the top (see 709) of the non-ribbed section (just below the ribbed section). This larger diameter portion 709 of the non-ribbed section frictionally engages with the inner surface of the base portion 102 a bit to help keep the base portion 102 axially aligned with the upper portion 104, and to prevent the base portion 102 and upper portion 104 from moving or wiggling around much relative to one another when coupled together (e.g., during shipping and handling of the self-heating beverage container assembly 100).

A plurality of tabs 710 are provided on an inner surface of the upper portion 104 around a perimeter thereof. These tabs 710 extend inward and are configured to engage a corresponding annular groove on the outer annular surface of the shoulder portion 110 of the container assembly 100.

Finally, there is a vent opening 779 in an external side surface of the upper portion 104 that is covered on an internal surface thereof by a filter patch 780. The filter patch 780 is permeable to pressurized gas, but not to liquid. In the event of overheating, for example, excess pressure can be relieved through this filter patch 780, but any liquid (or particulate) material such as the reactants will be contained within the reaction chamber.

Referring again to FIG. 2, a ring of fusible material 226 (e.g., a wax material that contains a reaction suppressant) is secured to an outer surface of the beverage container 103. This ring of fusible material 226 is configured to melt and fall off of the outer surface of the beverage container 103 if/when that outer surface reaches a particular temperature. If/when this happens, the ring of fusible material 226 drops into the reaction to start quenching the reaction. In a typical implementation, therefore, the ring fusible material 226 can act as a safety measure to prevent over-heating in the self-heating beverage container assembly 100. There are a variety of ways to implement the ring of fusible material 226, with reactant suppressant, to the beverage container 103 as shown. Some of these are described in a prior patent filing that published under International Publication No. WO 2005/108878, entitled Thermostatic Temperature Control for Self-Heating Containers, and in U.S. Pat. No. 9,108,789, entitled Method for Adding a Fusible Material to a Container Wall, both of which were by the current applicant, Tempra Technology, Inc., and both of which are incorporated herein by reference, entirely. In general, the suitability of a particular reactant suppressant will depend on the type of reaction that is to occur in a particular self-heating container 100. For example, borate-based suppressants, such as those disclosed in the WO 2005/108878 patent publication tend to be effective for suppressing reactions that involve the oxidation of a polyol fuel with a permanganate oxidizer. As another example, sodium silicate-based suppressants, which are also disclosed in the WO 2005/108878 patent publication, tend to be effective for suppressing reactions that involve calcium oxide and water.

The shoulder portion 110 sits atop and snaps onto the top of the upper portion 104 of the self-heating beverage container assembly 100. The shoulder portion 110 is a hollow structure with an inner cross-sectional diameter that becomes smaller from the bottom of the shoulder portion 110 to the top of the shoulder portion 110. The outer surface of the shoulder portion defines an annular groove 801 that is configured to receive the tabs 710 on the inner surface of the upper portion 104 of the container assembly, when the shoulder portion 110 is snapped onto the upper portion 104 of the container assembly 100. In some implementations, the shoulder portion 110 may be welded or otherwise adhered (with an adhesive material) to the upper portion.

A gripping cylinder 803 is provided inside the shoulder portion 110 to frictionally grip an outer surface of the beverage can 103. Also, an annular groove 805 is provided to receive and hold the rolled perimetral edge at the top of the beverage can 103.

FIGS. 9A-9H are images that illustrate the operational principles and functionalities of the self-heating beverage container 100, according to one particular implementation thereof. FIGS. 9A-9E show an enclosed version of the self-heating beverage container (on the left) with arrows indicating how a human user would be manipulating the container, and a cut-away view showing what happens inside the container in response to the indicated manipulations.

Figure 9A:
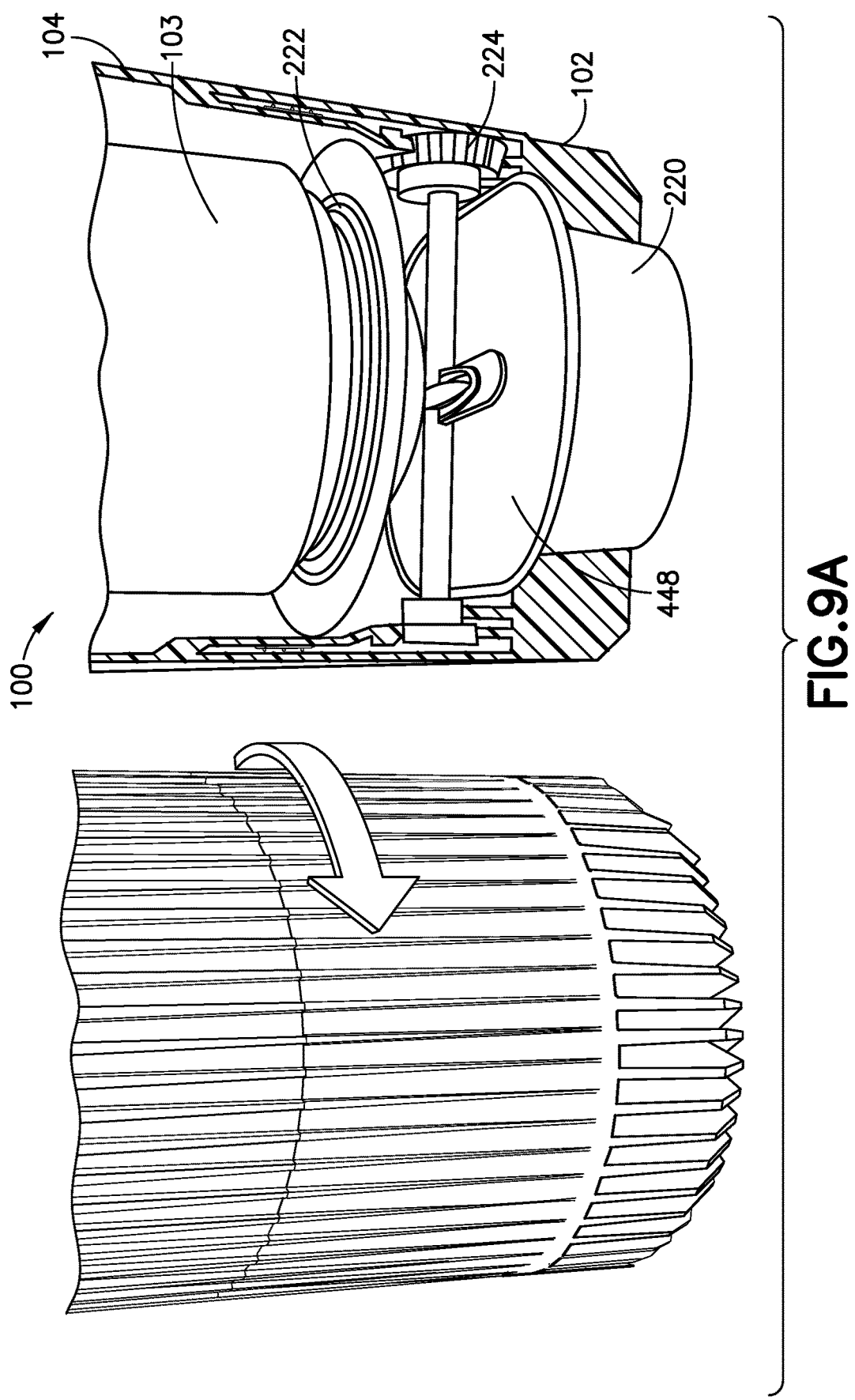
FIGS. 9A-9H are images that illustrate the operational principles and functionalities of the self-heating beverage container 100, according to one particular implementation thereof.

FIG. 9A represents the very beginning of the heater activation process. The cutting element 224 in FIG. 9A is in a neutral position with its cutting assemblies (e.g., 553a) lying in a substantially horizontal plane between the first reactant container 220 (which is below the cutting element) and the second reactant container 222 (which is above the cutting element). Neither the cutting blade 554a, nor the blade guard 555a in the illustrated configuration is applying a significant amount of force to either the seal 448 on the first reactant container 220 or on the second reactant container 222. As indicated by the arrow in the image on the left side of FIG. 9A, the user has just begun to rotate the base portion 102 of the self-heating container 100 relative to the upper portion 104 of the self-heating container 100.

Figure 9B:
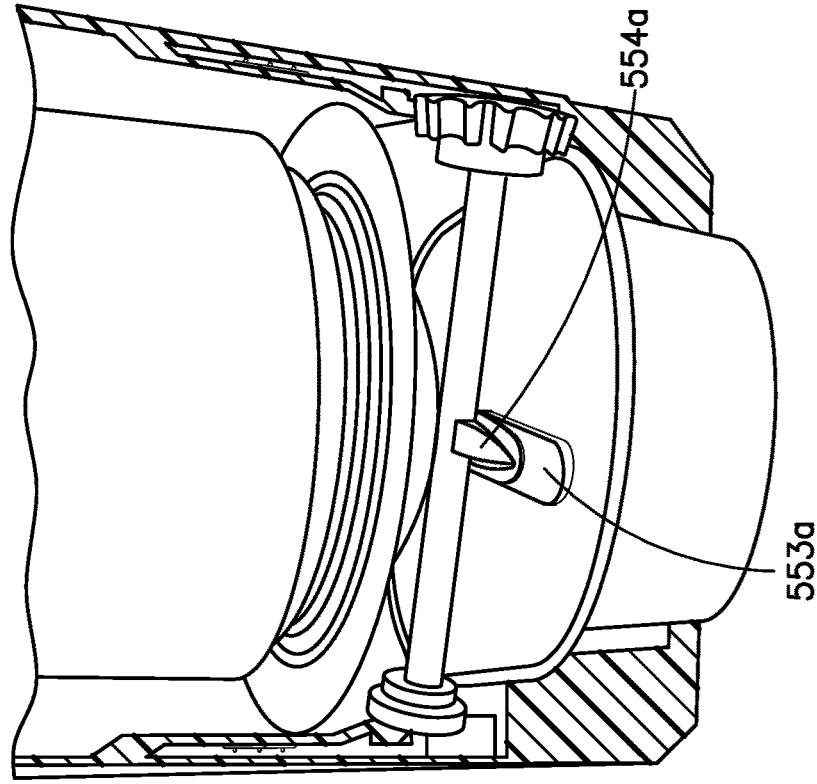
Figure 9B:
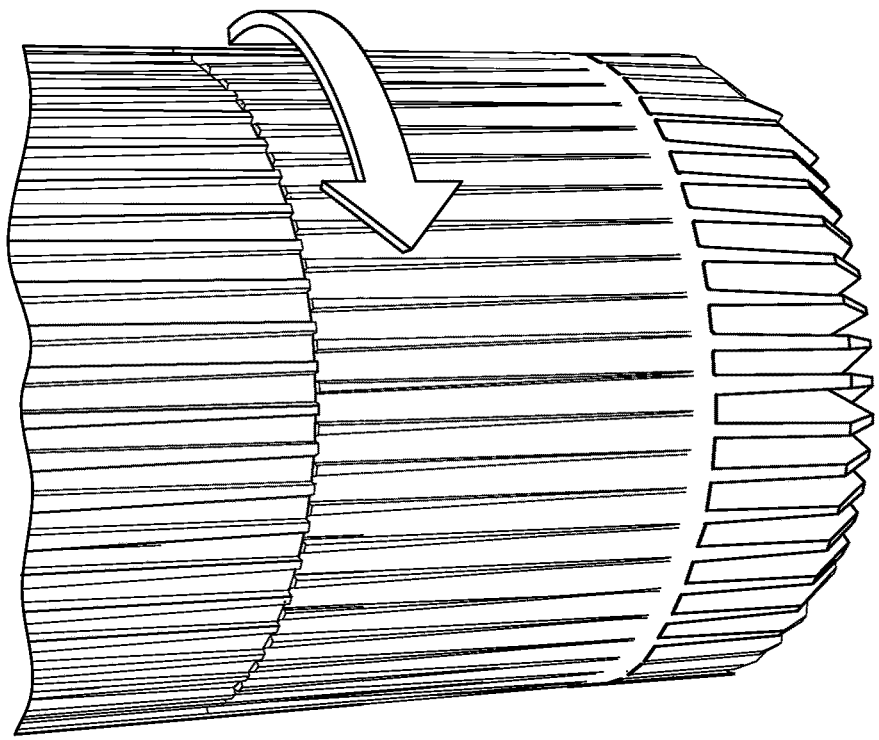

The image on the left side of FIG. 9B shows that the user has continued to rotate the base portion 102 of the self-heating container 100 relative to the upper portion 104 of the self-heating container 100. The amount of relative rotation that has occurred, as represented in FIG. 9B, is greater than the amount of relative rotation that has occurred, as represented in FIG. 9A. As the base portion 102 of the self-heating container 100 is rotated relative to the upper portion 104 of the self-heating container 100, the ring gear 705 and pinion gear 224b collectively translate that relative rotational motion into a rotational motion by the cutting assembly 224 about its longitudinal axis. In FIG. 9B, the rotational motion has begun and the cutting assembly 553a has moved toward and started pressing down on the seal 448 of the first reactant container 220. More specifically, the blade guard 555a is pressing down on the seal 448 of the first reactant container 220. Although not visible in FIG. 9B, in a typical implementation, the cutting assembly 553b (opposite the visible cutting assembly 553a) would, at the point represented in FIG. 9B, be moving toward and starting to press into the second reactant container 222.

Figure 9C:
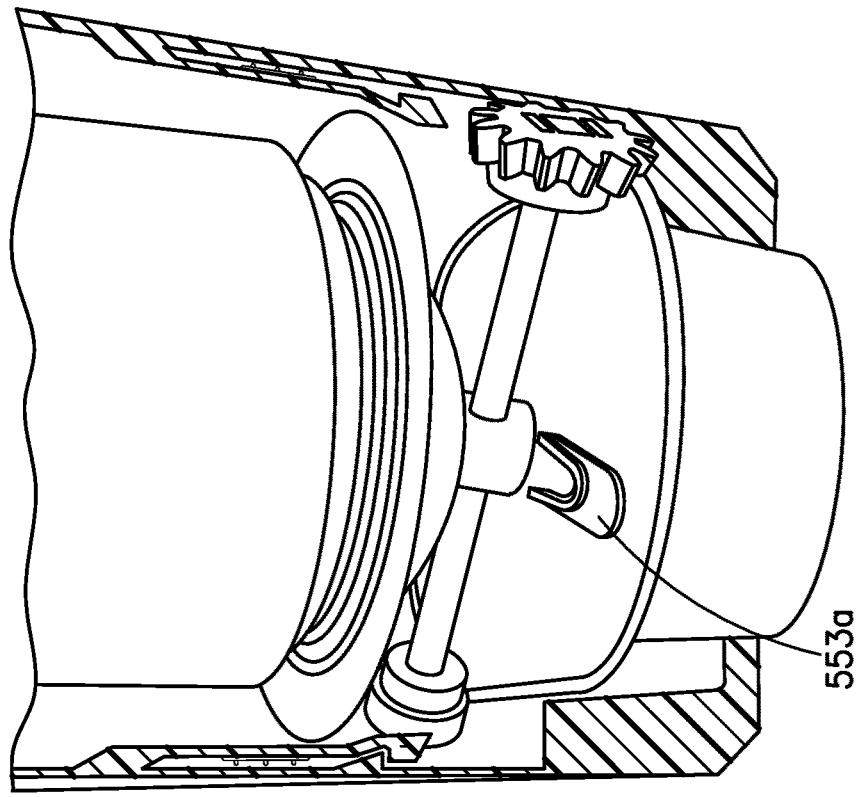
Figure 9C:
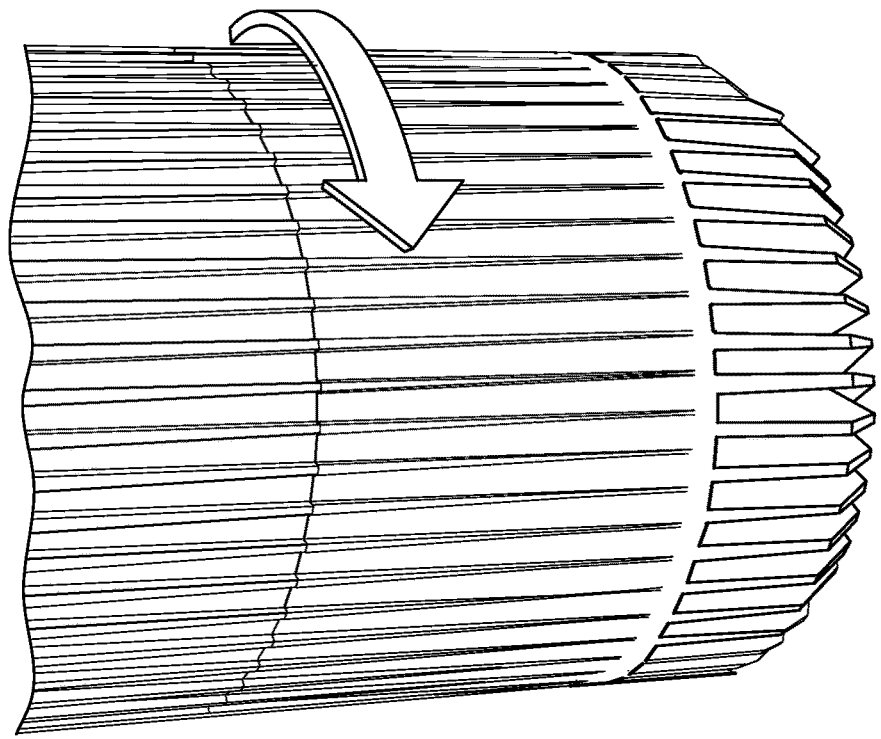

The image on the left side of FIG. 9C shows that the user has continued to rotate the base portion 102 of the self-heating container 100 relative to the upper portion 104 of the self-heating container 100. The amount of relative rotation that has occurred, as represented in FIG. 9C, is greater than the amount of relative rotation that has occurred, as represented in FIG. 9B. In FIG. 9C, the blade guard 555a is shown as having snapped off of the shaft (via its weak point or bridge 556) from the torque applied to the blade guard 555a by virtue of the distal end of the blade guard having pressed down on the seal 448 with a sufficient amount of force. Although not visible in FIG. 9C, in a typical implementation, the cutting assembly 553b (opposite the visible cutting assembly 553a) may, at the point represented in FIG.

9C, have also had its blade guard 555b snap off the shaft (via its weak point or bridge 556) from the torque applied to the blade guard 555a by virtue of the distal end of the blade guard having pressed down on the seal 448 with a sufficient amount of force. With the blade guard 555a removed, the cutting blade 554a is free to move down and start cutting into the seal 448 of the first reactant container 220. Likewise, with the opposite blade guard 555b removed, that cutting blade 554b is free to move up and start cutting into the second reactant container 222.

Figure 9D:
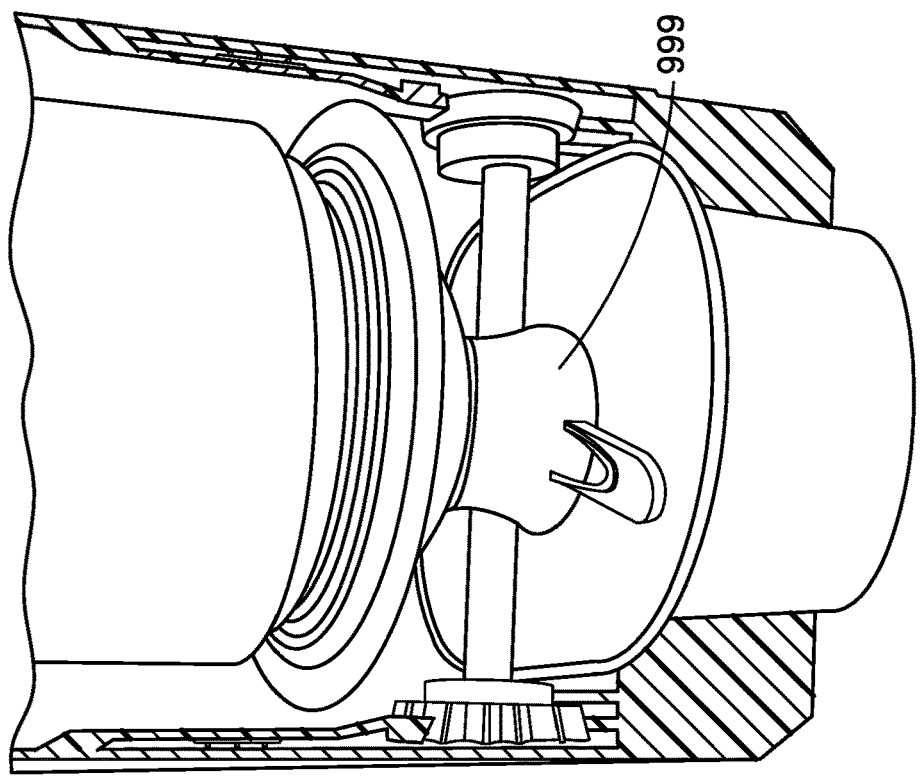
Figure 9D:
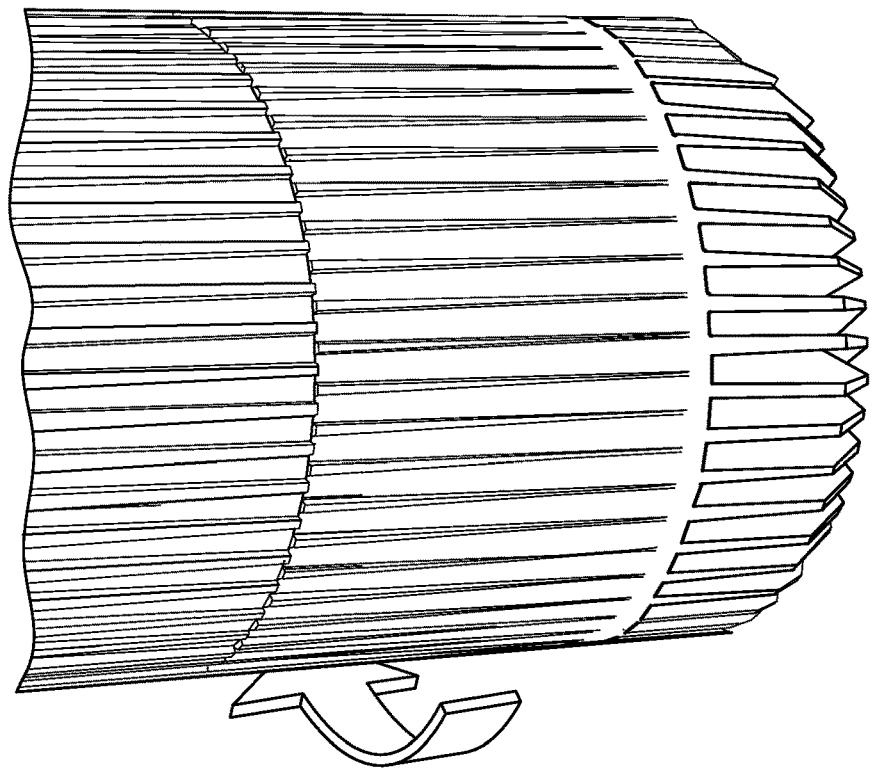

The image on the left side of FIG. 9D shows that the user has continued to rotate the base portion 102 of the self-heating container 100 relative to the upper portion 104 of the self-heating container 100. The amount of relative rotation that has occurred, as represented in FIG. 9D, is greater than the amount of relative rotation that has occurred, as represented in FIG. 9C. In FIG. 9D, the cutting blade 554a has cut through the seal 448 of the first reactant container 220 and likewise the cutting blade 554b (not visible) has cut through the second reactant container 222. The liquid contents (e.g., glycerin or the like) from the second reactant container 222 are released to flow down into the open first reactant container 220 thereby contacting the first reactant (e.g., solid, granular or powdered potassium permanganate or the like). The reaction 999 is shown as having begun which would include producing heat per its exothermic nature. As the reaction continues, heat fills the space (i.e., the reaction chamber) between the outer housing and the beverage container 103. Some of this heat is transferred through the beverage container 103 and into the beverage for heating.

Figure 9E:
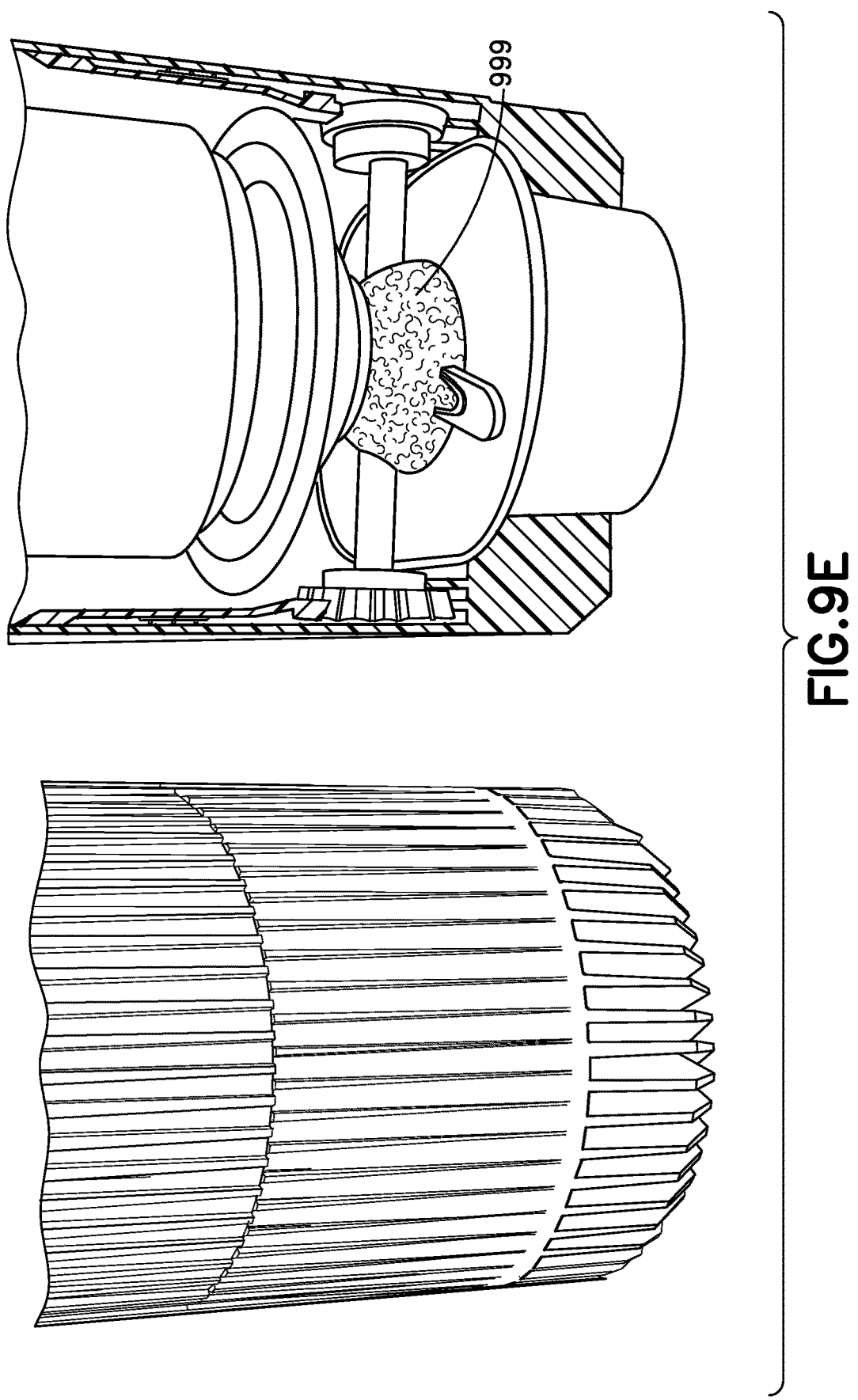

In the image on the left side of FIG. 9E, the user has finished rotating the base portion 102 of the self-heating container 100 relative to the upper portion 104 of the self-heating container 100. The amount of relative rotation that has occurred, as represented in FIG. 9E, is greater than the amount of relative rotation that has occurred, as represented in FIG. 9D. In FIG. 9E, the cutting blade 554a has cut even more of the seal 448 away from the first reactant container 220. Likewise, the cutting blade 554b (not visible) will have cut even more of the second reactant container 222. This greater amount cutting provides the opportunity for greater or faster fluid flow from the second reactant container 222 to the first reactant container 220—to facilitate even greater or faster heating. At least some of the heat generated continues to flow into the beverage through the walls of the beverage container 103.

Figure 9F:
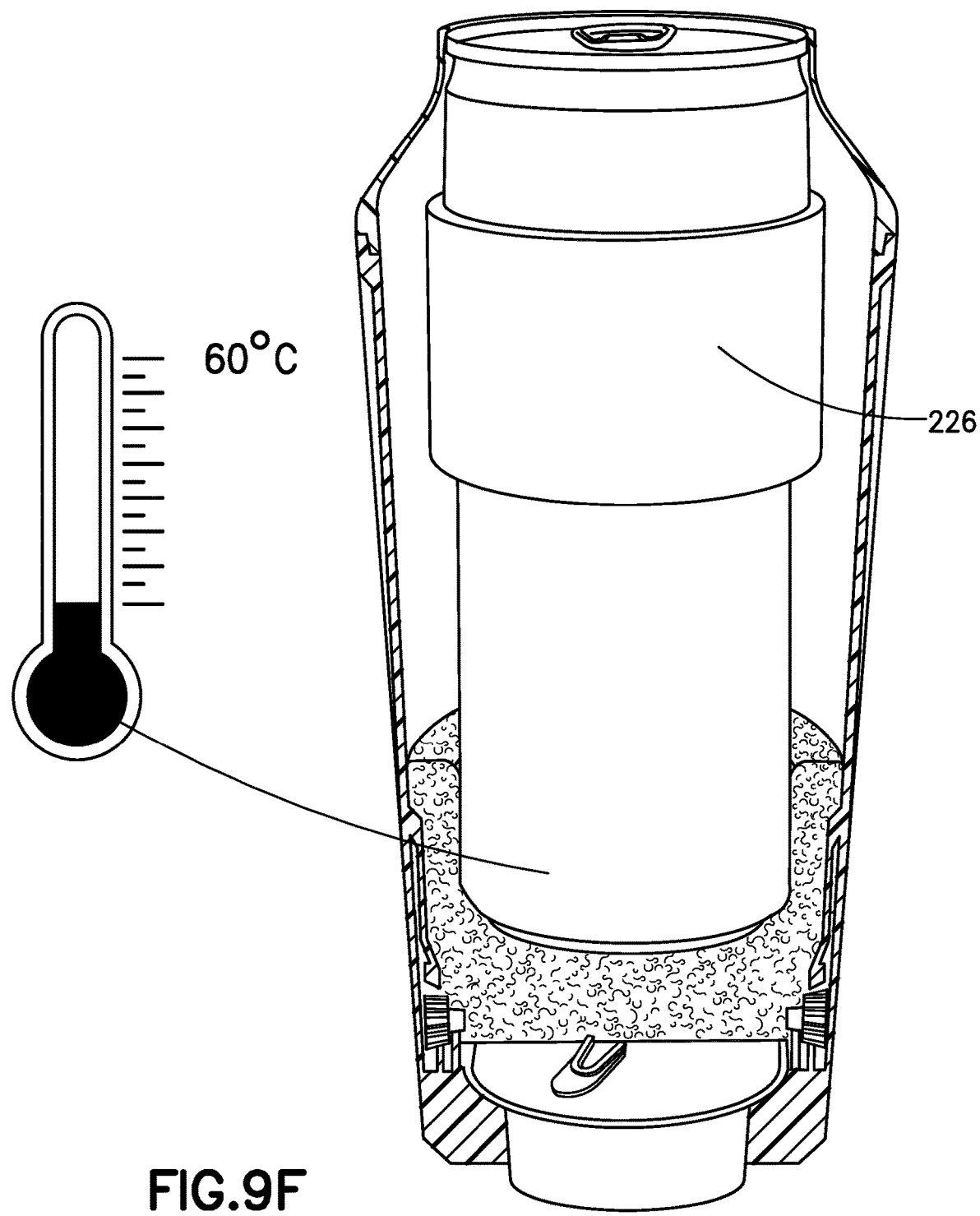
Figure 9G:
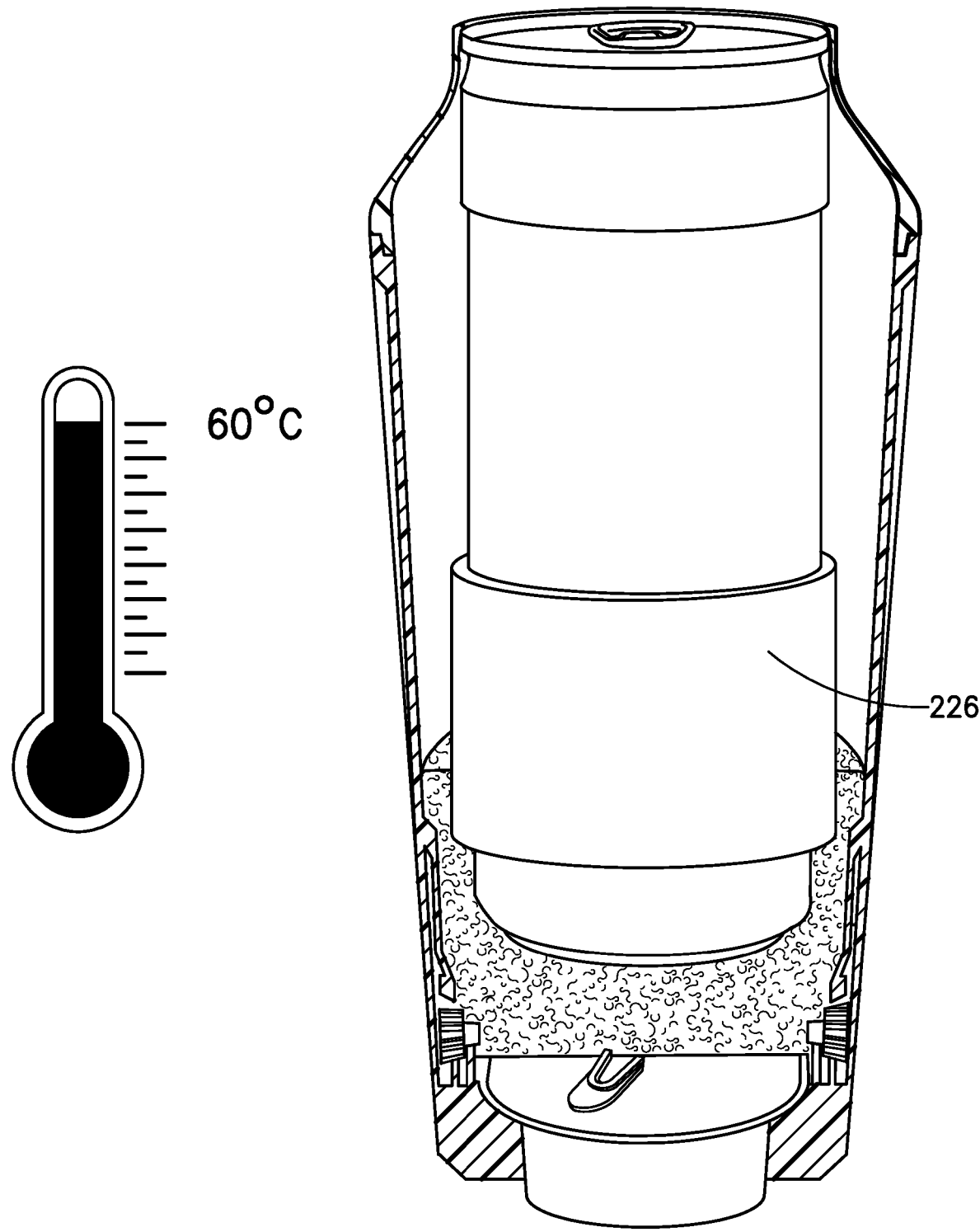
Figure 9H:
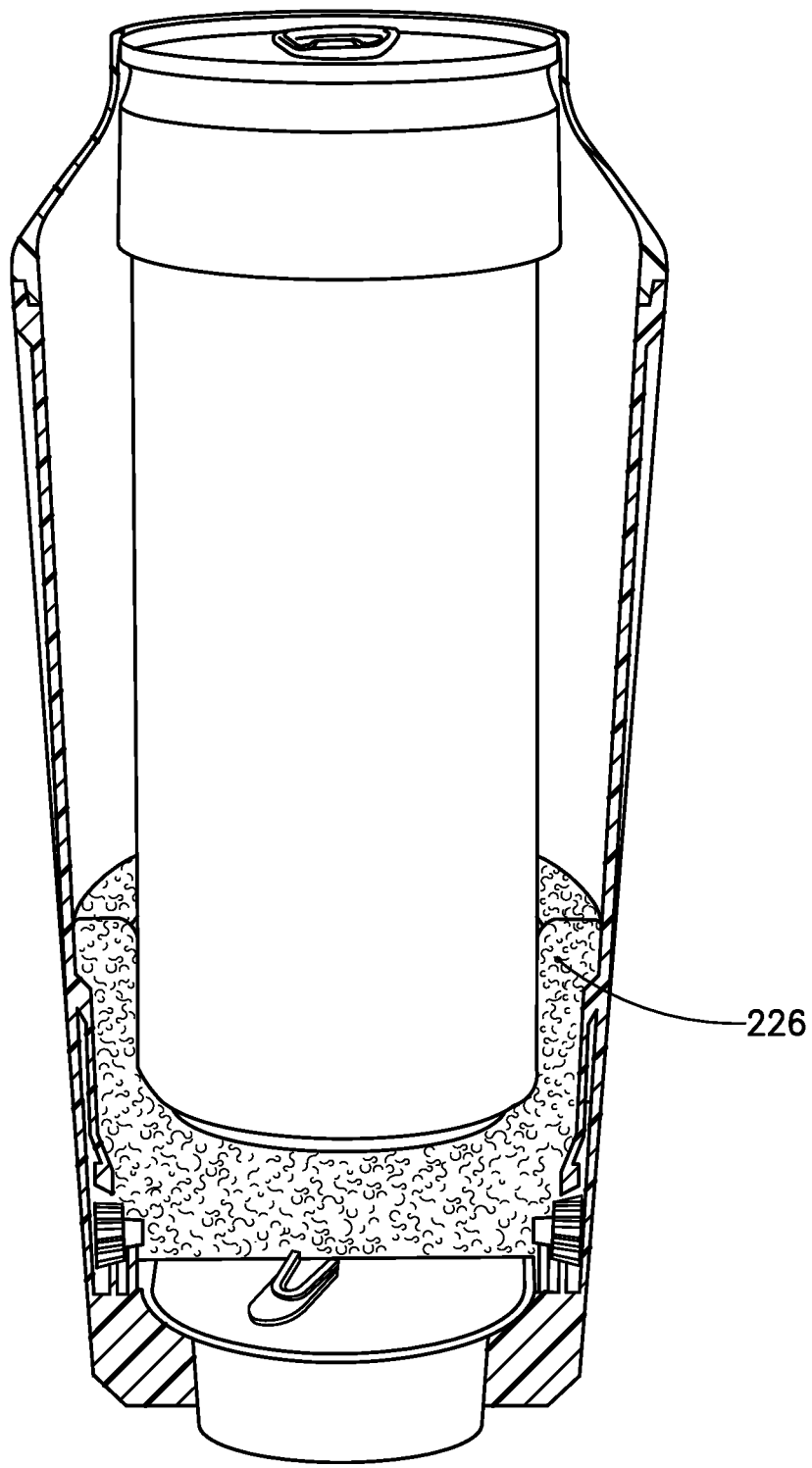

FIGS. 9F-9G illustrate how the ring 226 of fusible material (that includes a reactant suppressant) might come into play to help to control the temperature of the beverage container 100 during the exothermic chemical reaction. The ring 226 in the illustrated implementation is configured such that its inner surface, which is in contact with the outer surface of the beverage container 103, will melt when the temperature of the outer surface of the beverage container 103 reaches a temperature of 60 degrees Celsius (or any other chosen temperature).

In FIG. 9F, the reaction is underway in the reaction chamber and is producing heat that is being transferred from the reaction chamber, through the beverage container 103, to the beverage contained therein. This heat also of course raises the temperature of the beverage container 103 itself. The temperature on the outer surface of the beverage container 103 is represented by the schematic thermometer, which shows a temperature of less than 60 degrees Celsius. Since the fusible material in the ring is configured to remain intact (and not melt) until the temperature reaches 60 degrees Celsius, the ring 226, as expected, is shown in place, holding onto the outer surface of the beverage container 103, well above the reaction taking place in the reaction chamber below the ring 226.

In FIG. 9G, the reaction is further along in time than the reaction was in FIG. 9F. The schematic thermometer in FIG. 9G indicates that the temperature on the outer surface of the beverage container 103 has reached 60 degrees Celsius, the melting point of the ring 226. Since the outer surface of the beverage container 103 has reached 60 degrees Celsius, the inner annular surface of the ring 226 melts and the ring 226 begins to slide down into the reaction that is still happening at the bottom of the reaction chamber. When the ring 226 (or more specifically the reaction suppressant in the melting ring) comes into contact with the reactants, the reaction suppressant begins to suppress the reaction. In some implementations, this suppression tends to reduce the intensity of the reaction and the heat being produced thereby.

Figure 10:
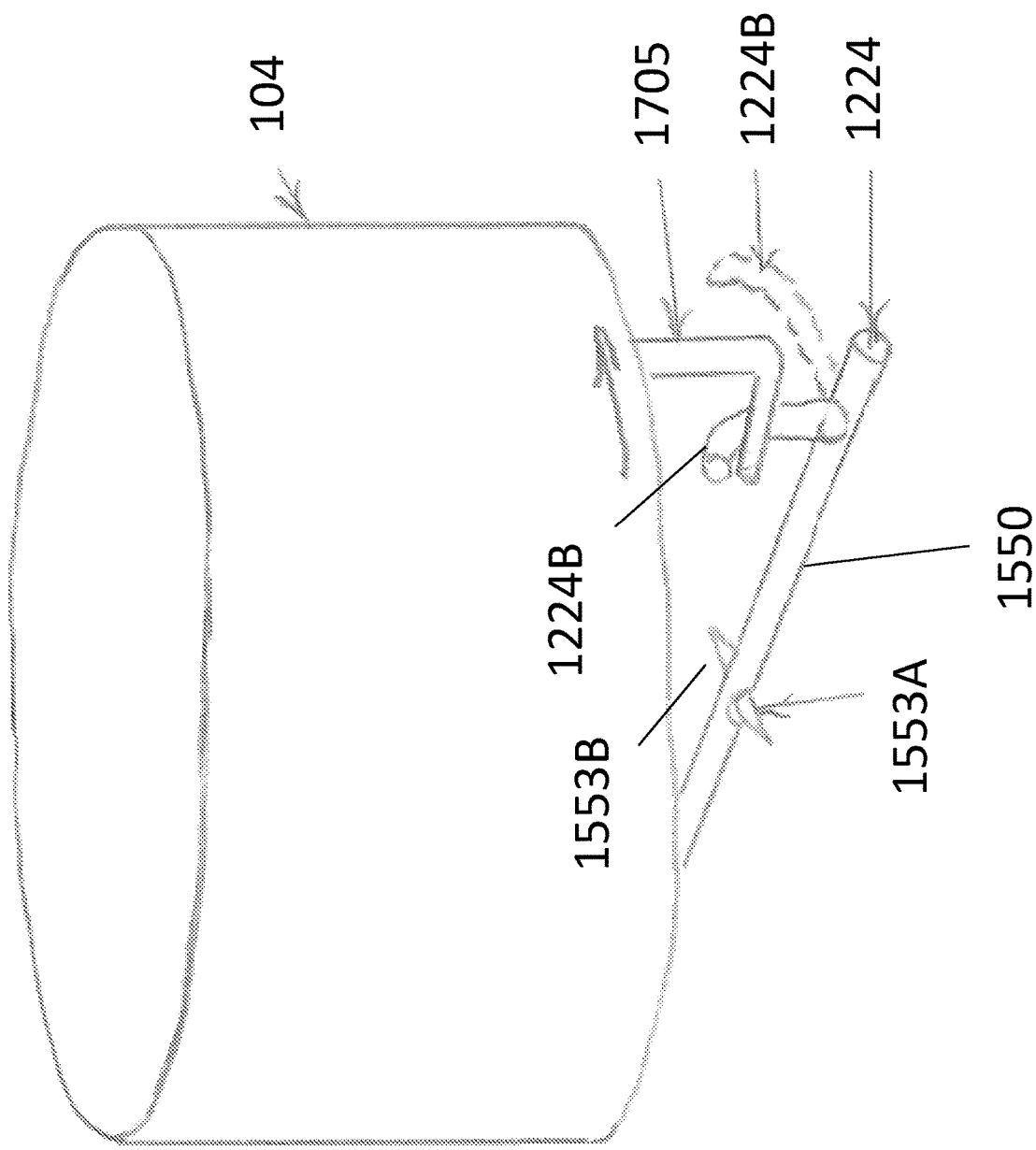
FIG. 10 is a partial perspective view showing an alternative implementation of an actuating mechanism for a self-heating beverage container assembly.

FIG. 10 is a partial perspective view showing an alternative implementation of an actuating mechanism for a self-heating beverage container assembly 1100. The illustrated implementation shows, schematically, the upper portion 1104 of the self-heating beverage container assembly 1100, the cutting assembly 1224 (with cutting blade assemblies 1553a, 1553b extending from its shaft 1550). In a typical implementation, the illustrated components would form part of a self-heating beverage container assembly 1100, such as the self-heating beverage container assembly 100 otherwise described herein.

In the illustrated implementation, an activation bar 1705 extends in a vertically-downward direction from the bottom surface of the upper portion 1104. The illustrated activation bar 1705 is bent about 90-degrees to extend in a radially-inward, substantially horizontal direction (e.g., toward an axis of the self-heating beverage container assembly 1100). The substantially horizontal portion of the activation bar 1705 is configured to contact a corresponding push bar 1224b that extends in an upward direction from the shaft 1550 of the cutting assembly 1224. The activation bar 1705 is rigidly secured to the upper portion 1104 of the container 1000 so that when the upper portion 1104 of the container is rotated (as represented by the arrow) relative to the base portion (not shown), the activation bar pushes push bar 1224b from a first position (shown in solid line) to a second position (shown in dashed line). When this happens, the shaft 1550 of the cutting assembly 1224, of course, rotates causing one of the cutting blade assemblies 1553a to rotate up into the reactant container containing the liquid reactant and causing the other one of the cutting blade assemblies 1553b to rotate down into the reactant container containing the granular reactant.

Thus, it can be seen that the activation mechanism represented in the FIG. 10 implementation is similar to the activation mechanism represented in the FIGS. 1-9 implementation disclosed herein, because in both implementations, a physical surface on the upper portion of the container presses against a physical surface on the cutting assembly, which causes the cutting assembly to rotate thereby turning its cutting blade assemblies into the reactant containers, one of which (the one containing liquid reactant) is above the cutting assembly, the other of which (the one containing the granular or powdered reactant) is below the cutting assembly. In the FIG. 10 implementation, the physical surface of the upper portion of the container is part of the activation bar 1705 and the physical surface on the cutting assembly is part of the push bar 1224b. In the FIGS. 1-9 implementation, the physical surface on the upper portion of the container would be part of the ring gear and the physical surface on the cutting assembly would be part of the pinion gear.

A number of embodiments of the invention have been described. Nevertheless, it will be understood that various modifications may be made without departing from the spirit and scope of the invention.

For example, each component of the self-heating beverage container assembly disclosed herein may have a different look, feel, size, configuration, etc. than what is shown herein. For example, the lower and upper portions need not have ribs on their outer surfaces. The structures and techniques used to mate the upper and lower portions and the shoulder portion to one another can vary. The size, shape and configuration of the first reactant container can vary. In some instances, in fact, the use of a separate container may be disposed of completely, with the first (solid, granular or powdered) reactant simply contained inside the reaction chamber.

The cutting assembly can vary. In some implementations (e.g., one where there is only one reactant container to be ruptured), the cutting assembly may have only one (instead of two) cutting blades assembly. The way that the pinion gear mates up with the cutting assembly can vary. For example, the pinion gear could be simply adhered or welded onto the shaft of the cutting assembly, or the pinion gear could be formed as an integral part of the cutting assembly. The cutting assembly can have more than two cutting blade assemblies. The cutting assembly could, in some instances, forgo the blade guards, particularly if the risk of accidental or inadvertent rotation of the cutting assembly shaft seems low. The size and shape of the cutting blades can vary as well. Moreover, the size, shape and specific configuration of the pinion gear can vary. In some instances, the single pinion gear could be replaced with a gear set that includes more than one intermeshed gears.

The method of sealing the interface between the upper portion of the container assembly and the base portion of the container assembly can vary.

The design, shape and configuration of the shoulder portion of the container assembly can vary as well.

Also, the product to be heated need not be a consumable beverage. It can be any one of a variety of products that might be desirable to heat, including food products, drinks, or non-edible goods.

As mentioned above, the solid reactant, whether in granular or non-granular form, can be an oxidizing agent (e.g., potassium permanganate, which may be coated with sodium silicate) and the liquid reactant can be a reduction agent (e.g., fuel). It is possible of course for other types of reactants to be used instead. In this regard, many oxidizing agents are capable of generating suitable energies upon reaction with a corresponding fuel. Typical oxidizing agents include those comprising the alkali metal salts of the oxides of manganese and chromium. These include such compounds as potassium permanganate, and potassium chromate. Other suitable oxidizing agents are pyridinium dichromate, ruthenium tetroxide and chromic add, as well as a host of other oxidizing agents. Preferably, the oxidizing agent comprises alkali metal salts of permanganate. The corresponding fuels which may be suitable for use in the exothermic chemical reaction are generally organic compounds. Particularly well-suited organic compounds are alcohols. Alcohols are easily oxidized to carbonyl-containing compounds by the oxidizing agents described above. The alcohols may be primary alcohols, and preferably polyols which contain at least two hydroxyl groups. Such polyols are also readily oxidized to aldehydes and carboxylic acids. This oxidation of polyols and the simultaneous reduction of the oxidizing agent are generally accompanied by the release of significant amounts of heat energy. One preferred fuel is Glycerin.

Many of the component parts can be formed using by molding (e.g., injection molding or the like), but other manufacturing techniques may be utilized as well (or instead).

It has been found that, in order to ensure highly effective activation, the horizontal shaft should turn through at least 135 degrees in order to pierce and tear the liquid bag. However, this is not required. Even a small amount of deliberate twisting can start and cause the reaction to occur.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be described herein as occurring in a particular order or manner, this should not be understood as requiring that such operations be performed in the particular order shown or in sequential order, or that all illustrated operations be performed, to achieve desirable results. In certain circumstances, multitasking may be advantageous. Moreover, the separation of various system components in the embodiments described above should not be understood as requiring such separation in all embodiments, and it should be understood that the described program components and systems can generally be integrated together in a single product or packaged into multiple products.

Other implementations are within the scope of the claims.

What is claimed is:

1. A self-heating container assembly comprising:
   a housing comprising:
      a first portion having a cylindrical cross-section; and
      a second portion having a cylindrical cross-section,
      wherein the first portion of the housing and the second portion of the housing are mated together in a manner that permits the first portion to rotate about a common axis relative to the second portion;
   a ring gear on or attached to the first portion of the housing and configured to rotate with the first portion of the housing relative to the second portion of the housing;
   a rotatable cutting element supported by a support connected to the second portion of the housing;
   a pinion gear on the rotatable cutting element and coupled to the ring gear; and
   at least one reactant container containing a reactant adjacent to the rotatable cutting element, such that rotation of the rotatable cutting element results in the rotatable cutting element cutting into the at least one reactant container.

2. The self-heating container assembly of claim 1, wherein the at least one reactant container comprises:
   a first reactant container containing a first reactant above the rotatable cutting element; and
   a second reactant container containing a second reactant below the rotatable cutting element,
   wherein the first reactant and the second reactant are configured to react exothermically upon physical contact with one another.

3. The self-heating container assembly of claim 2,
   wherein the first reactant is a liquid first reactant,
   wherein the second reactant is a solid, granular or powdered, second reactant.

4. The self-heating container assembly of claim 2, wherein rotation of the rotatable cutting element results in the rotatable cutting element cutting into the first reactant container and into the second reactant container.

5. The self-heating container assembly of claim 1, wherein the rotatable cutting element comprises:
   a shaft; and
   at least one cutting blade assembly that extends from the shaft in a radially outward direction.

6. The self-heating container assembly of claim 5, wherein each cutting blade assembly comprises:
   a cutting blade configured to cut into the at least one reactant container, wherein the cutting blade extends out from the shaft.

7. The self-heating container assembly of claim 6, wherein each cutting blade assembly further comprises:
   a blade guard that extends outward from the shaft around the cutting blade to define a frame, within which the cutting blade sits.

8. The self-heating container assembly of claim 7, wherein the blade guard in each cutting blade assembly is connected to the shaft with a bridge.

9. The self-heating container assembly of claim 8, wherein the cutting blade is configured to remain in place attached to the shaft if and when the blade guard snaps off or breaks away from the shaft, thereby revealing or uncovering the cutting blade.

10. The self-heating container assembly of claim 5, wherein the at least one cutting blade assembly of the rotatable cutting element comprises:
    a first cutting blade assembly that extends from the shaft in a first radially outward direction; and
    a second cutting blade assembly that extends from the shaft in a second radially outward direction that is diametrically opposite the first radially outward direction.

11. The self-heating container assembly of claim 10, wherein the at least one reactant container comprises:
    a first reactant container above the rotatable cutting blade assembly; and
    a second reactant container below the rotatable cutting blade assembly,
    wherein rotation of the rotatable cutting element in one direction causes the first cutting blade assembly to cut into the first reactant container and causes the second cutting blade assembly to cut into the second reactant container.

12. The self-heating container assembly of claim 1, further comprising a can at least partially inside the housing, wherein the can contains a product to be heated.

13. The self-heating container assembly of claim 12, further comprising:
    a shoulder portion of the housing, wherein the shoulder portion of the housing is coupled to an upper one of the portions of the housing, the shoulder portion defining an opening at a top of the shoulder portion, and
    wherein the can is supported inside the shoulder portion and extends up through the opening at the top of the shoulder portion to expose a top surface of the can where a user may access an opening mechanism to open the can.

14. The self-heating container assembly of claim 1, wherein part of the first portion of the housing extends into the second portion, or wherein part of the second portion of the housing extends into the first portion,
    the self-heating container assembly further comprising a seal between the first portion of the housing and the second portion of the housing.

* * * * *